US012750282B2

(12) United States Patent
Beer et al.

(10) Patent No.: US 12,750,282 B2
(45) Date of Patent: Sep. 29, 2026

(54) COMPONENT BASED, CUSTOMIZABLE DESIGN ENVIRONMENT FOR COMPLEX ANALYSIS PROCESSES ON MONITORING DATA

(71) Applicant: Dynatrace LLC, Waltham, MA (US)

(72) Inventors: Wolfgang Beer, Bad Hall (AT); Thomas Natschlaeger, Hagenberg (AT); Herwig Moser, Freistadt (AT); Hans Kohlreiter, Traun (AT)

( * ) Notice: Subject to any disclaimer, the term of this patent is extended or adjusted under 35 U.S.C. 154(b) by 211 days.

(21) Appl. No.: 18/605,233

(22) Filed: Mar. 14, 2024

(65) Prior Publication Data

US 2024/0323095 A1 Sep. 26, 2024

Related U.S. Application Data

(60) Provisional application No. 63/454,338, filed on Mar. 24, 2023.

(51) Int. Cl.

| | |
|---|---|
| ***H04L 41/14*** | (2022.01) |
| ***G06F 8/36*** | (2018.01) |
| ***G06F 11/07*** | (2006.01) |
| ***G06F 11/30*** | (2006.01) |
| ***H04L 41/12*** | (2022.01) |

(52) U.S. Cl.

CPC .............. *H04L 41/145* (2013.01); *G06F 8/36* (2013.01); *G06F 11/079* (2013.01); *G06F 11/3006* (2013.01); *H04L 41/12* (2013.01)

(58) Field of Classification Search

CPC ......... H04L 41/145; H04L 41/12; G06F 8/36; G06F 11/079; G06F 11/3006; G06F 11/0709; G06F 11/323; G06F 11/3495

See application file for complete search history.

(56) References Cited

U.S. PATENT DOCUMENTS

| | | | | |
|---|---|---|---|---|
| 2004/0049565 | A1 | 3/2004 | Keller et al. | |
| 2018/0129726 | A1 * | 5/2018 | Park | G06F 18/231 |
| 2020/0042426 | A1 * | 2/2020 | Ambichl | G06F 11/3495 |
| 2022/0358023 | A1 * | 11/2022 | Moser | G06F 11/3447 |

* cited by examiner

*Primary Examiner* — Tonia L Dollinger
*Assistant Examiner* — Joseph M Cousins

(57) ABSTRACT

A technology is disclosed for fast and straightforward development of complex, multi-layered analysis processes for semi-structured application monitoring data. The analysis process is divided into sub-tasks, like moving to/identifying portions of monitoring data that needs to be analyzed and performing statistical analyses on identified monitoring data portions. Generic, configurable analysis components performing those sub-tasks are provided. Those analysis components include interfaces to access monitoring data, to communicate analysis results with other analysis components, and to provide visualization data for the results of performed analyses. An analysis process definition language is used to compose networks of interacting analysis nodes, which in cooperation implement arbitrarily complex analysis tasks. An interactive analysis design environment combines means to configure and interconnect those analysis components with their capability. The design environment provides analysis result visualization data to create a "WYSIWYG"-like design experience for complex analysis processes.

13 Claims, 15 Drawing Sheets

System Overview – Production Environment

FIG. 1: System Overview – Production Environment
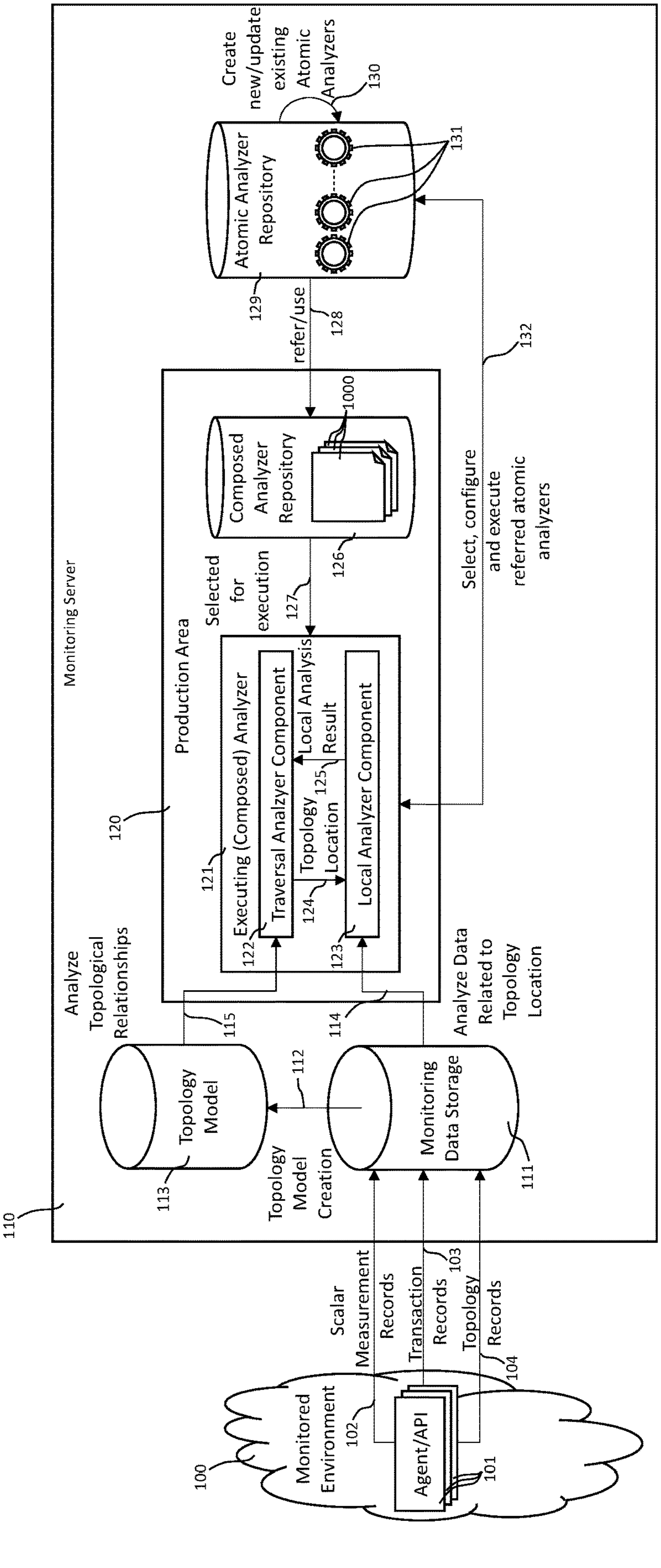

FIG. 2: Separation of Concerns
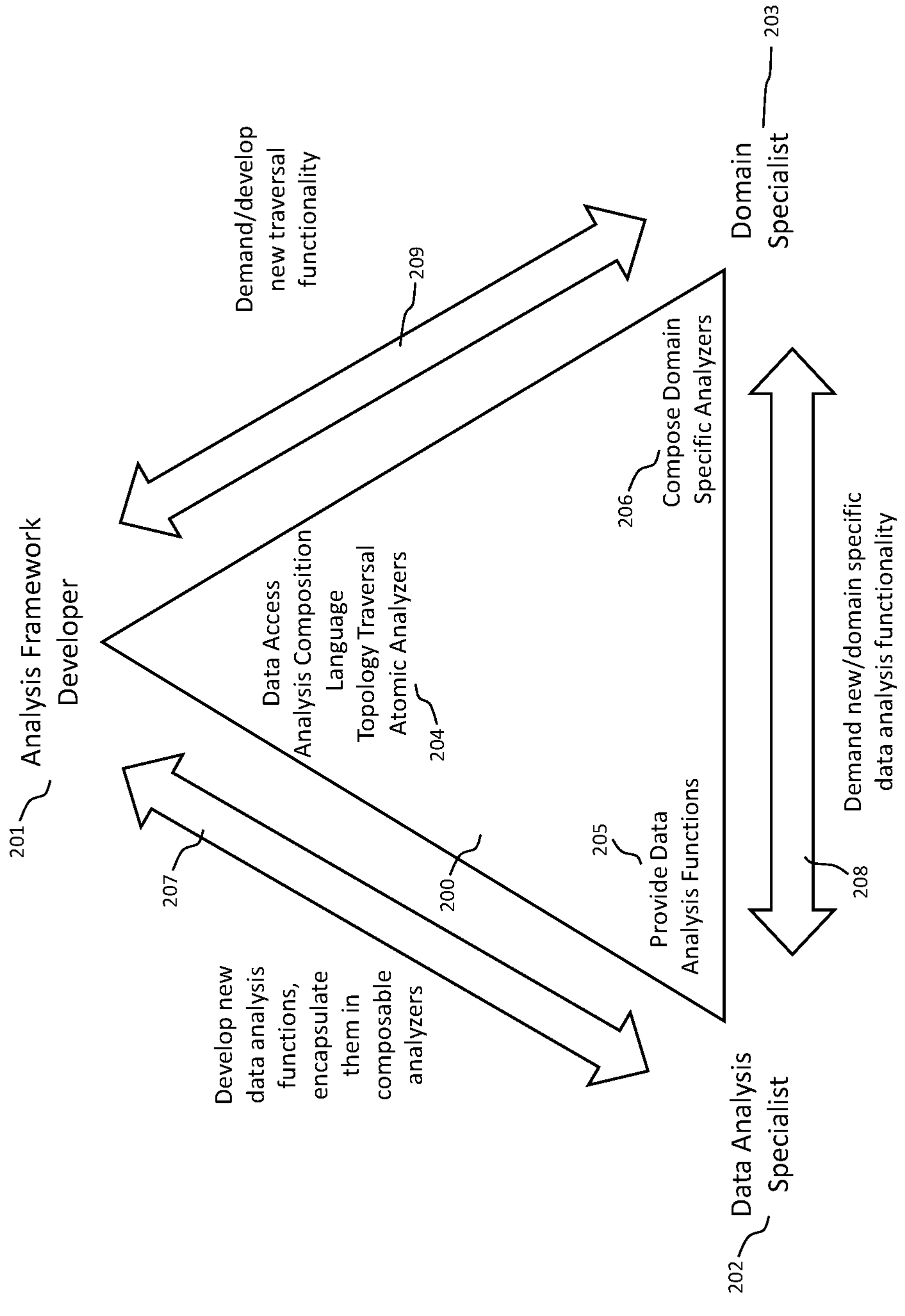

FIG. 3: Exemplary Atomic Analyzers – Trigger Event Generator
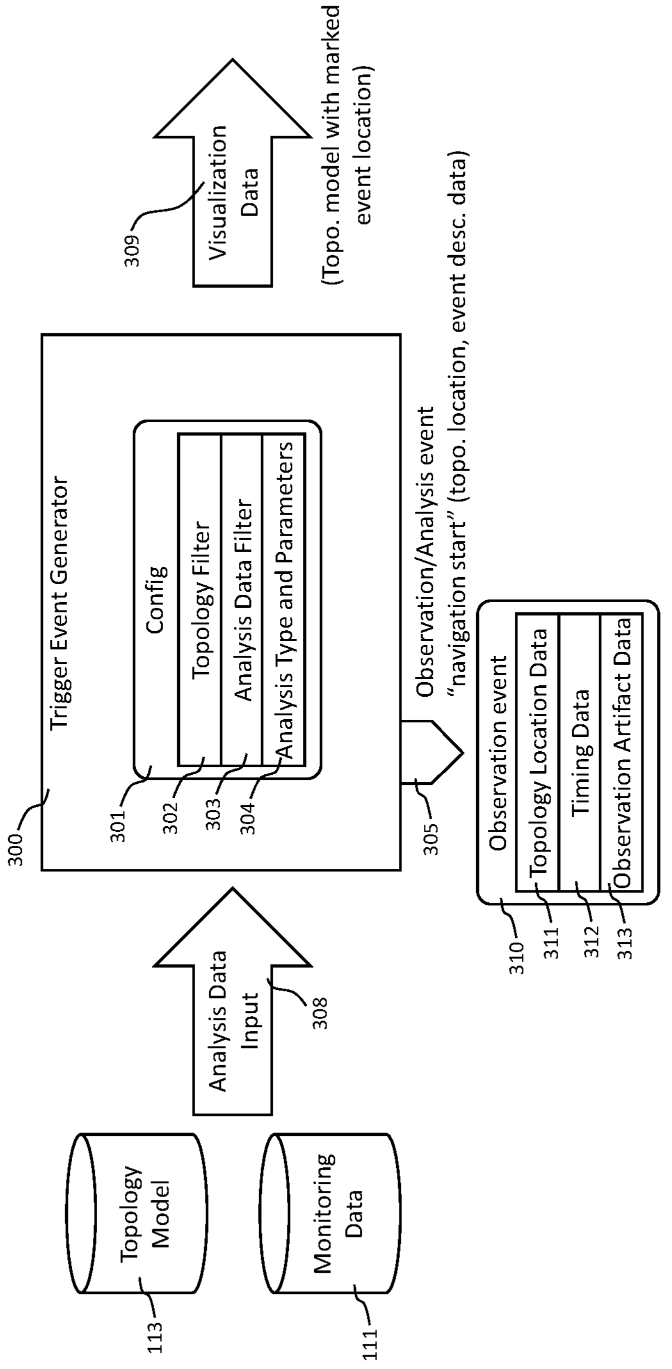

FIG. 4: Exemplary Atomic Analyzers – Topology Dependency Walker
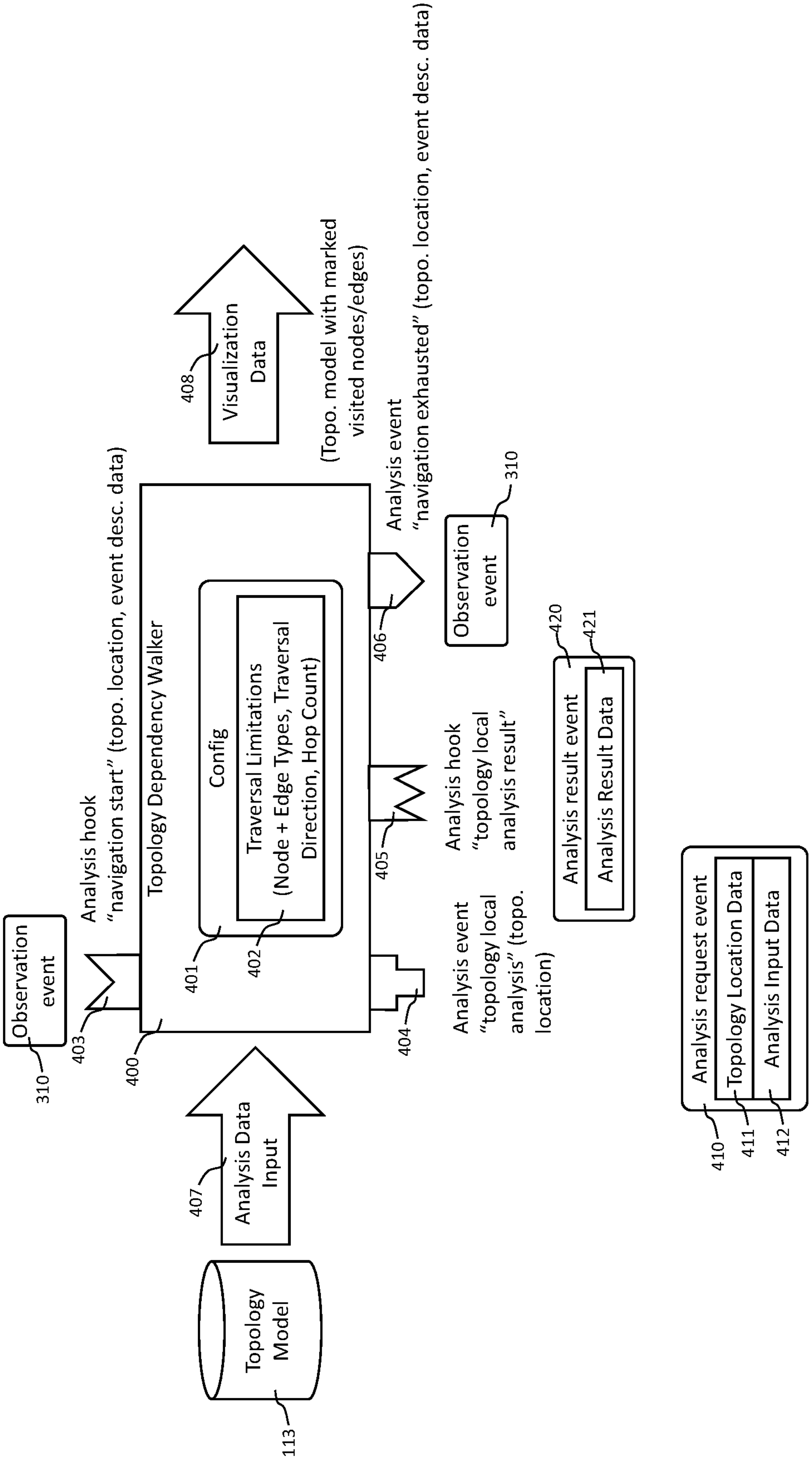

FIG. 5A: Exemplary Atomic Analyzers – Topology Location Analyzer
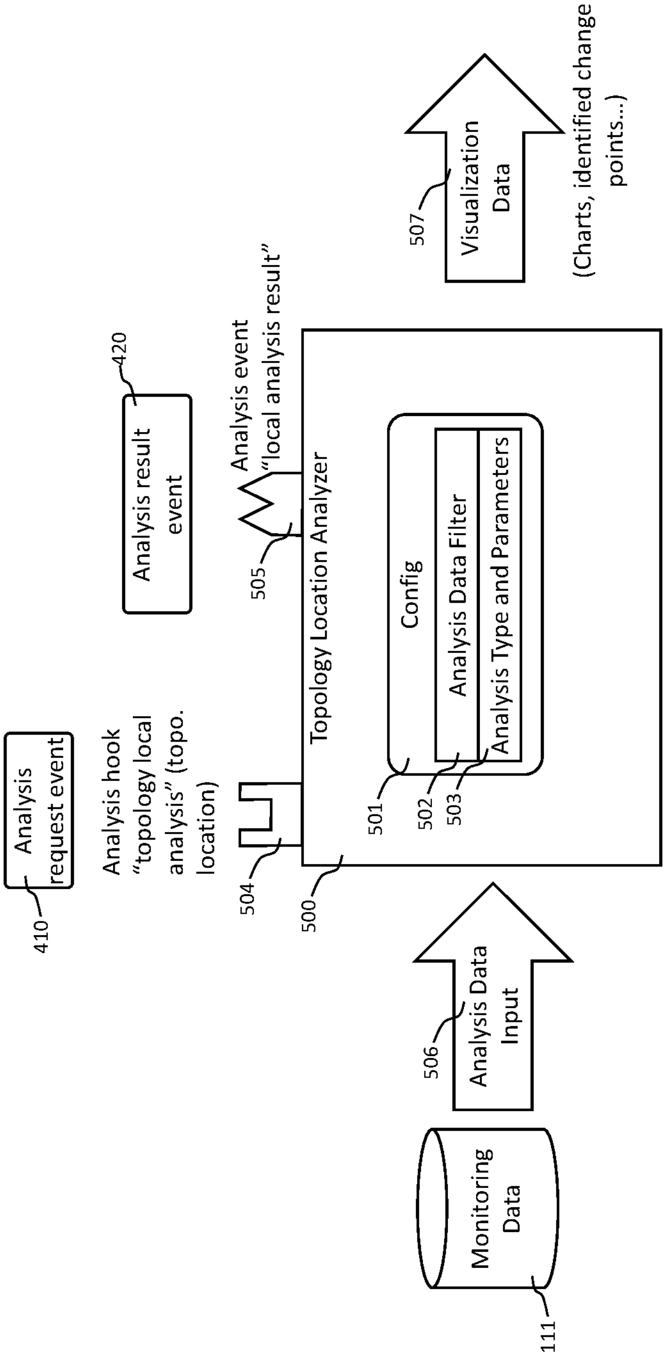

FIG. 5B: Generic Description of Multi-Staged Analysis as Performed by Interacting Analysis Components
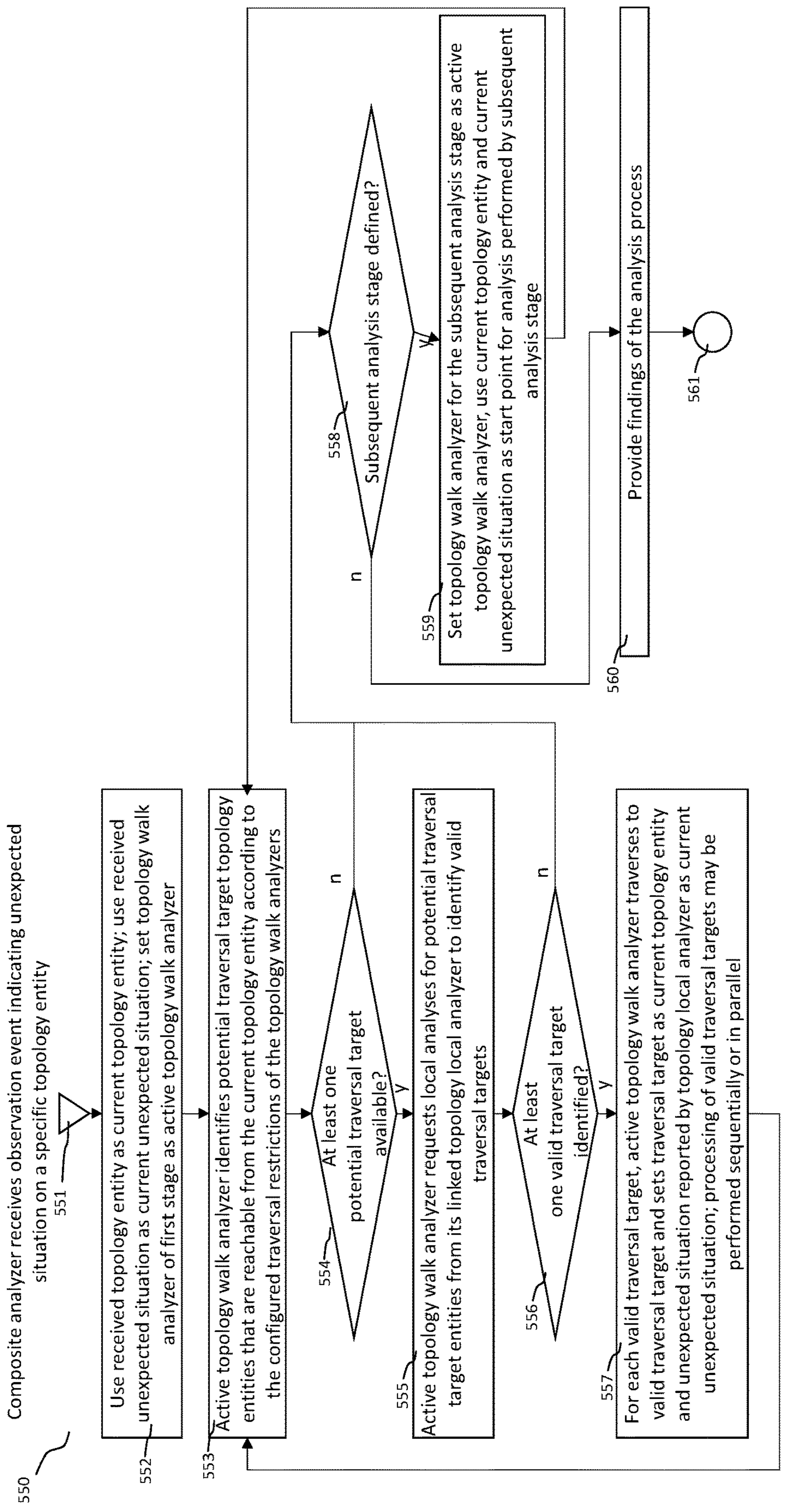

FIG. 6: Exemplary Composite Analyzer – Performance Degradation
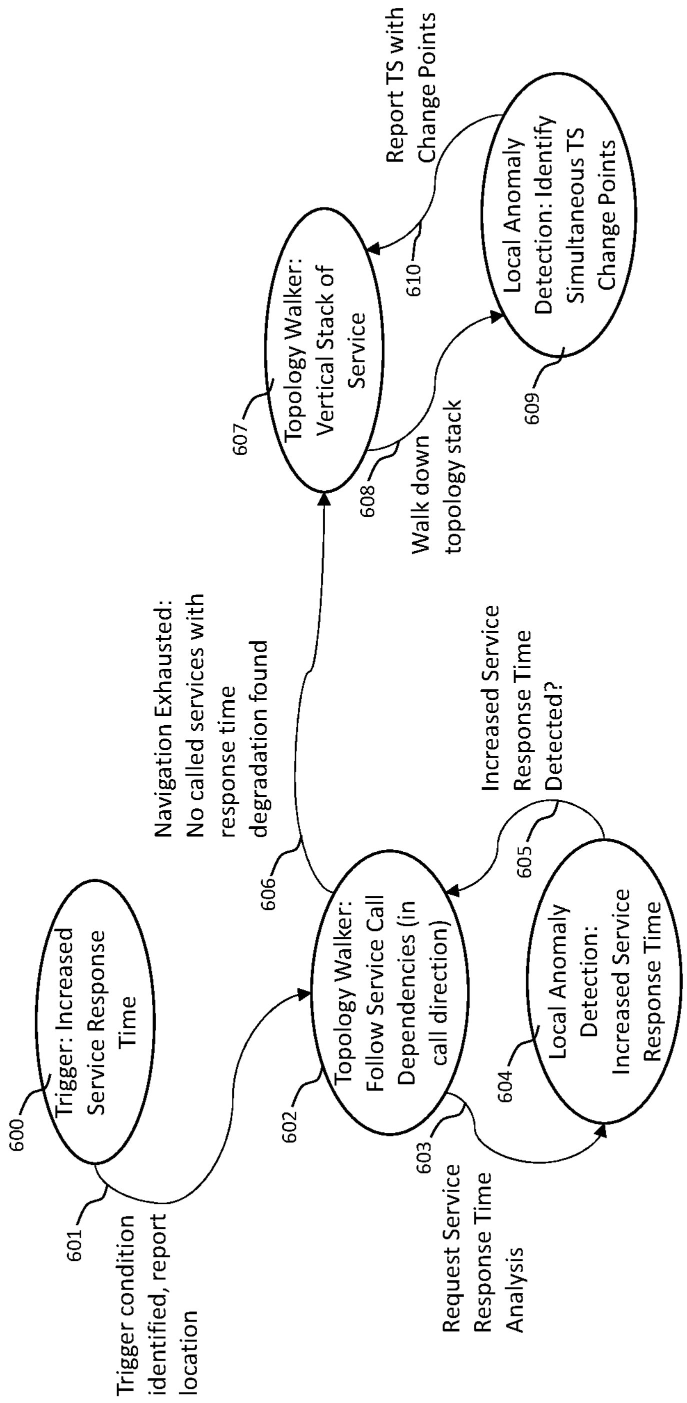

FIG. 7: Exemplary Composite Analyzer – Exploitable Vulnerability
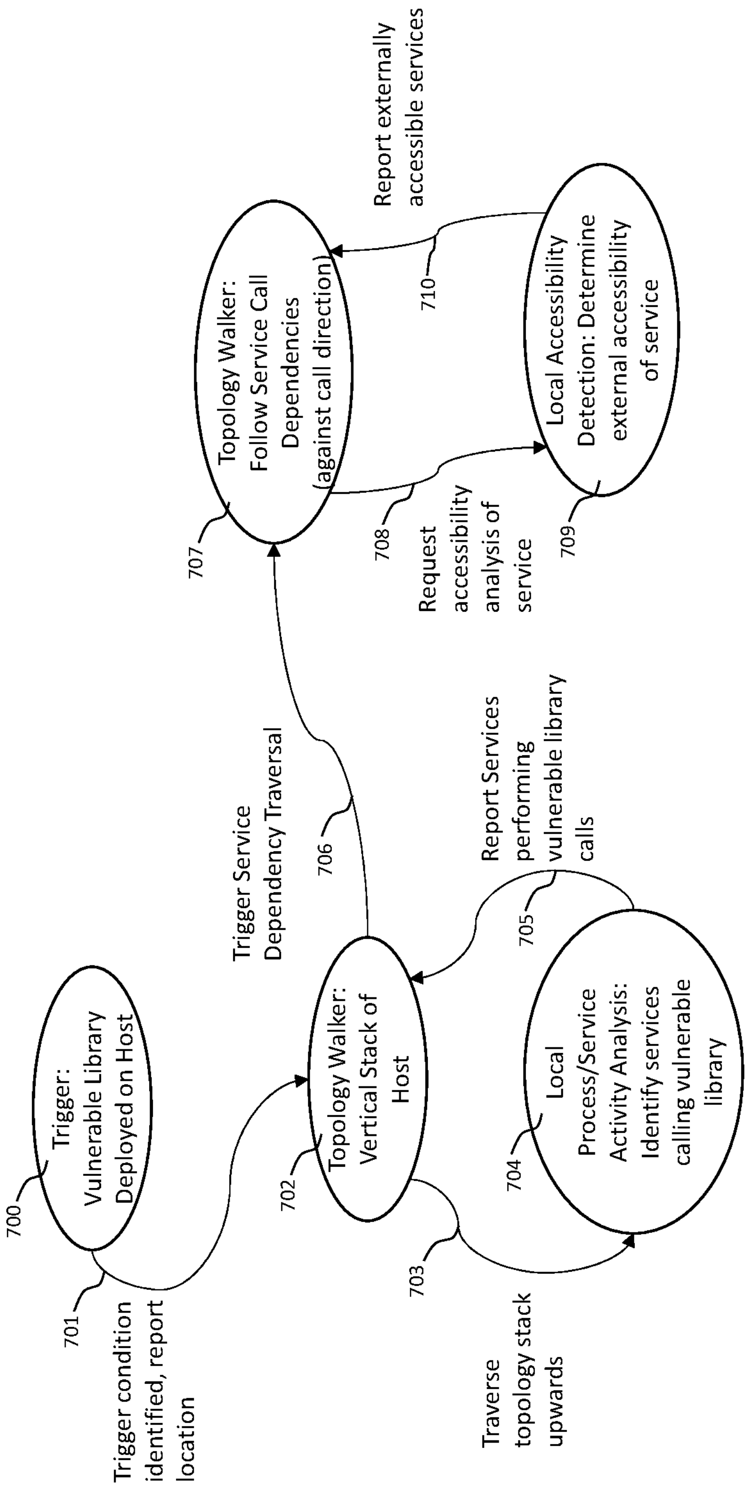

FIG. 8A: System Overview – Integrated Production and Development Environment
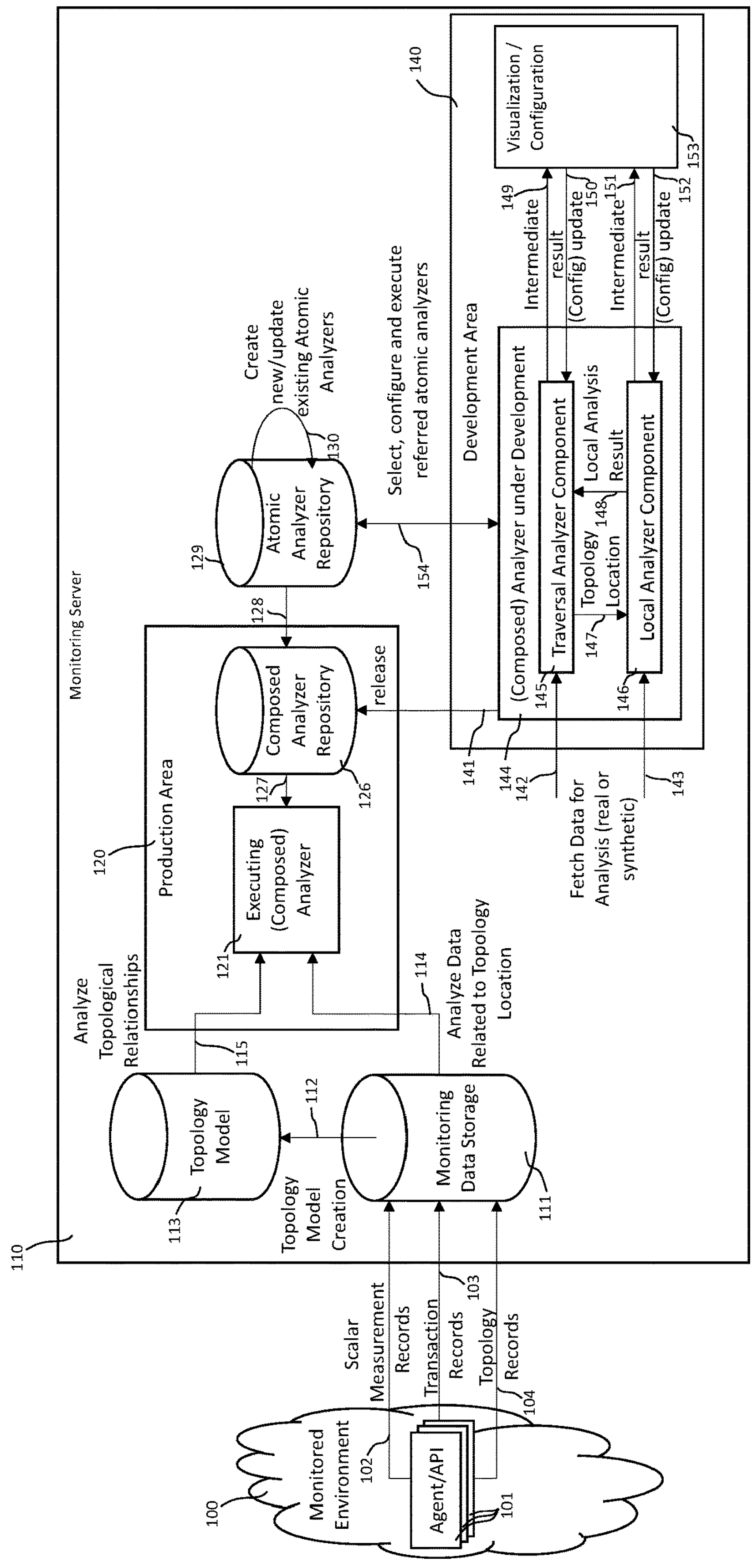

FIG. 8B: Interactive Analyzer Composition
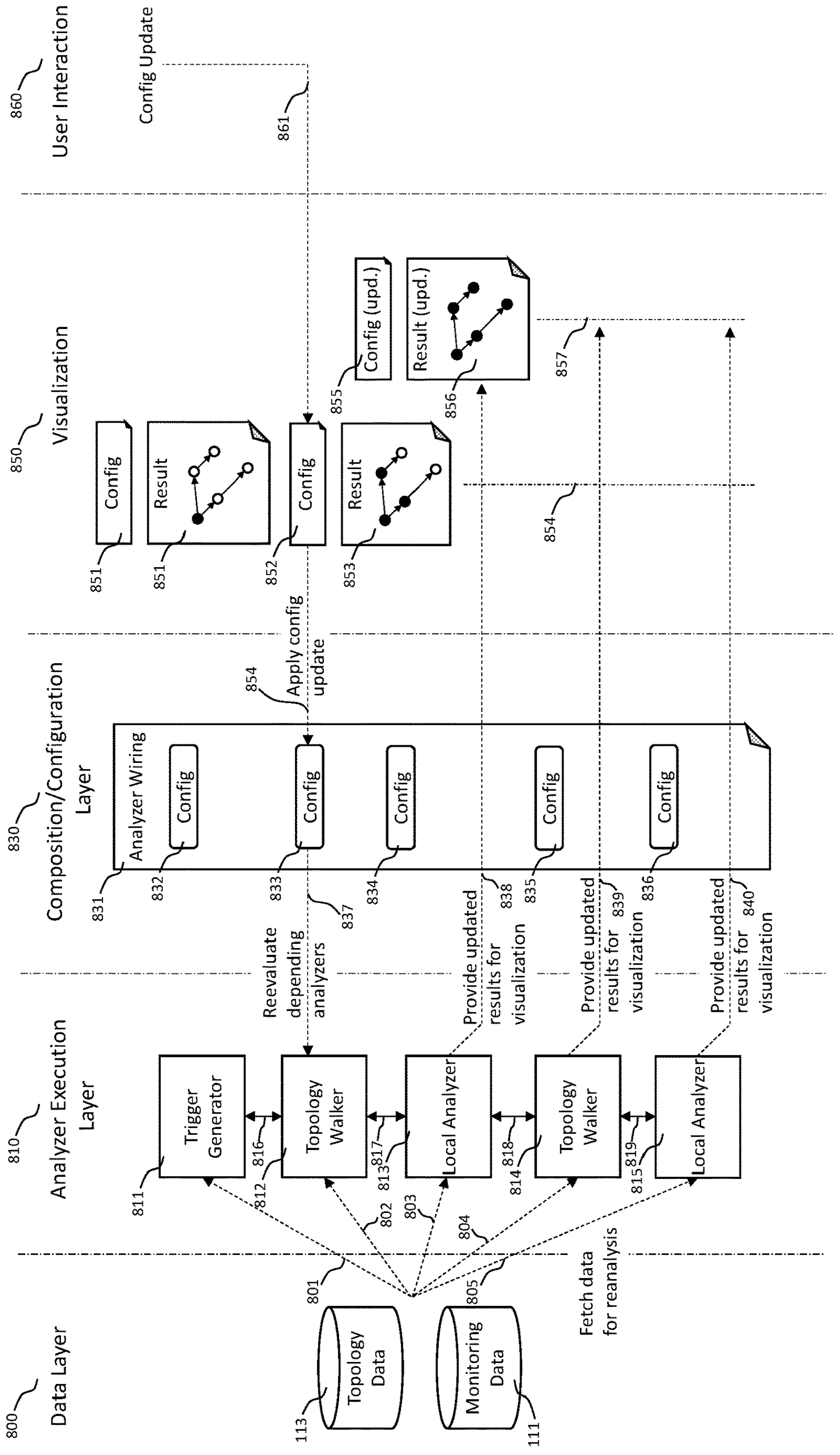

Analyzer Composition and Update Processes
FIG. 9A: Composition from scratch
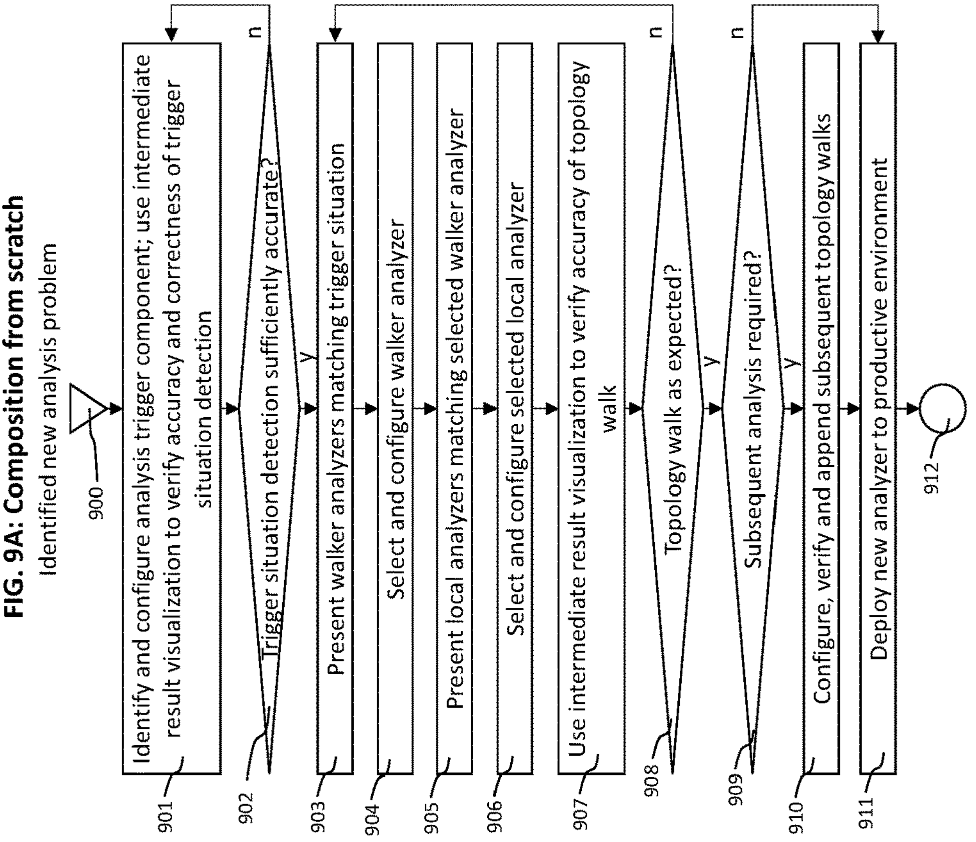
FIG. 9B: Update/Fix existing analyzer
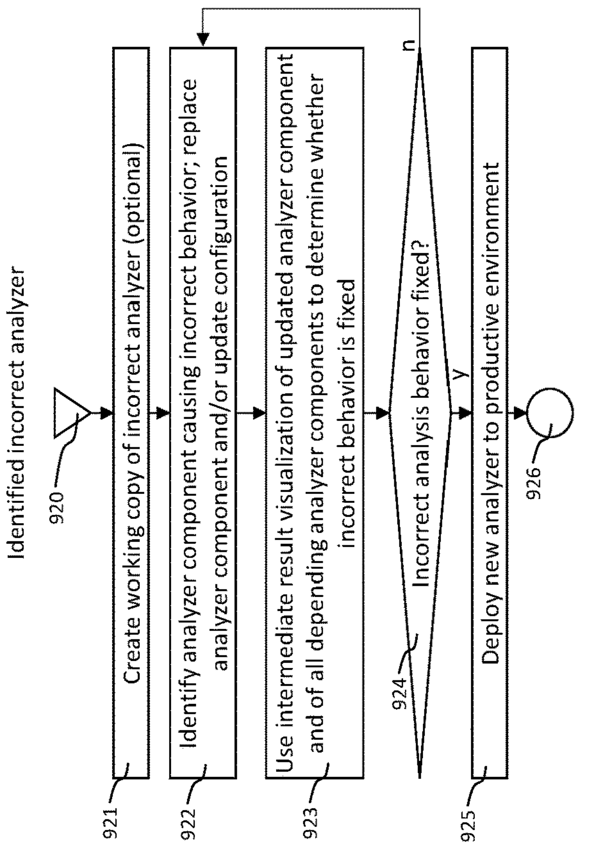

FIG. 10: Structure of Composite Analyzer Definition
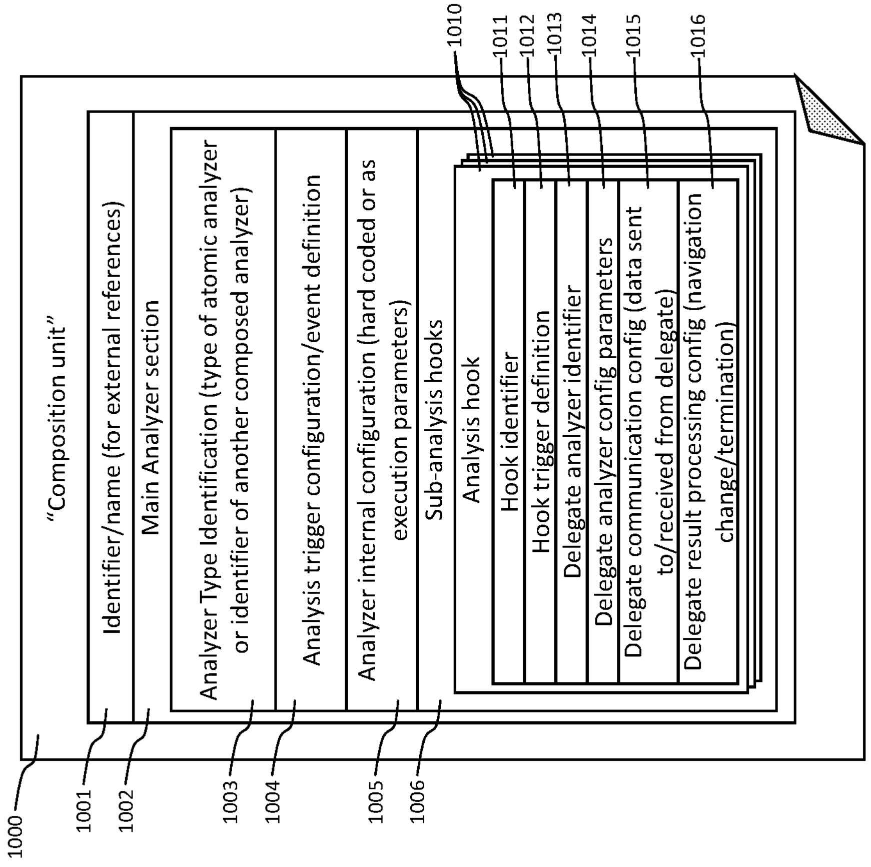

FIG. 11: Exemplary Composite Analyzer
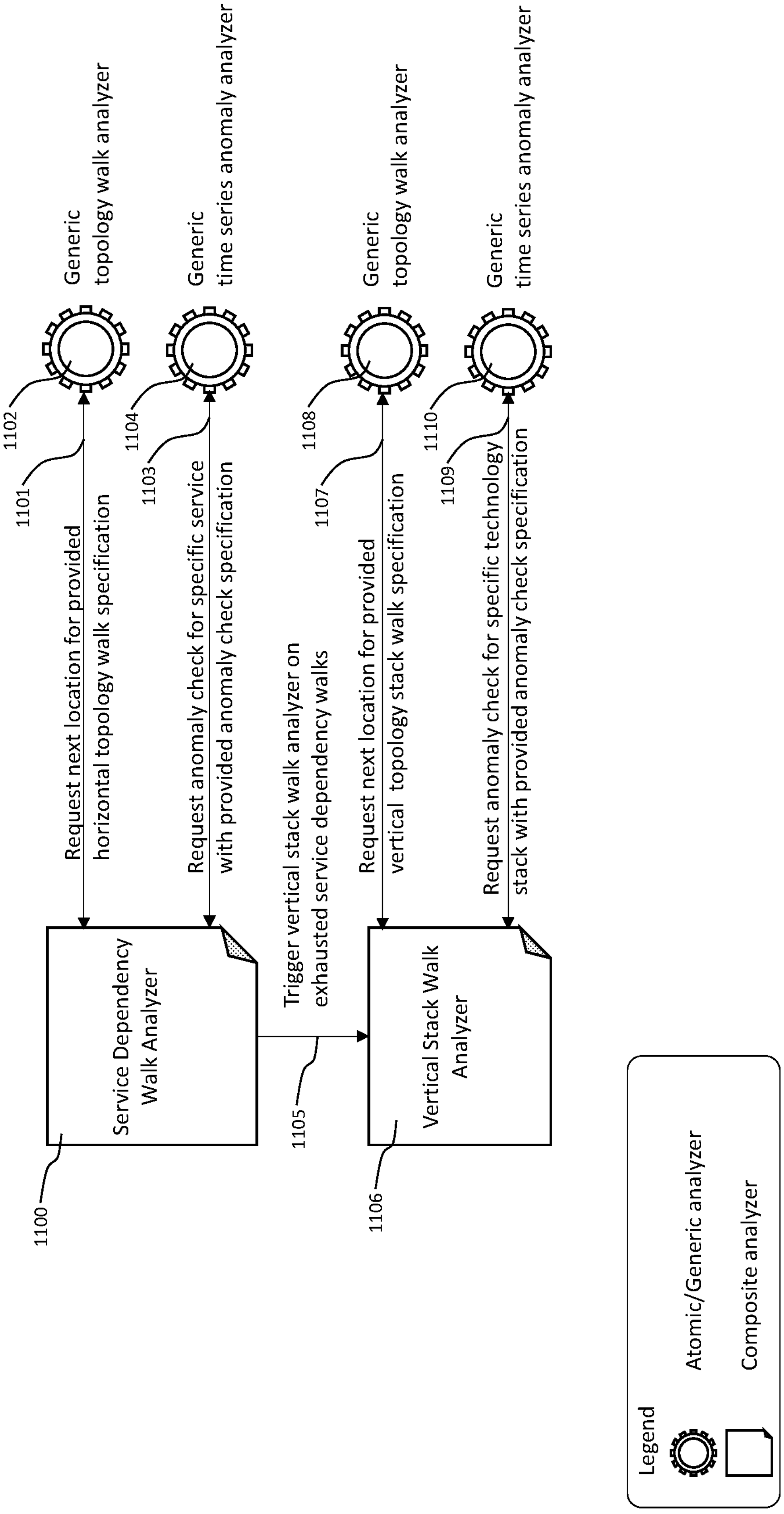

FIG. 12: Exemplary Navigation Macros – Unhealthy Cluster
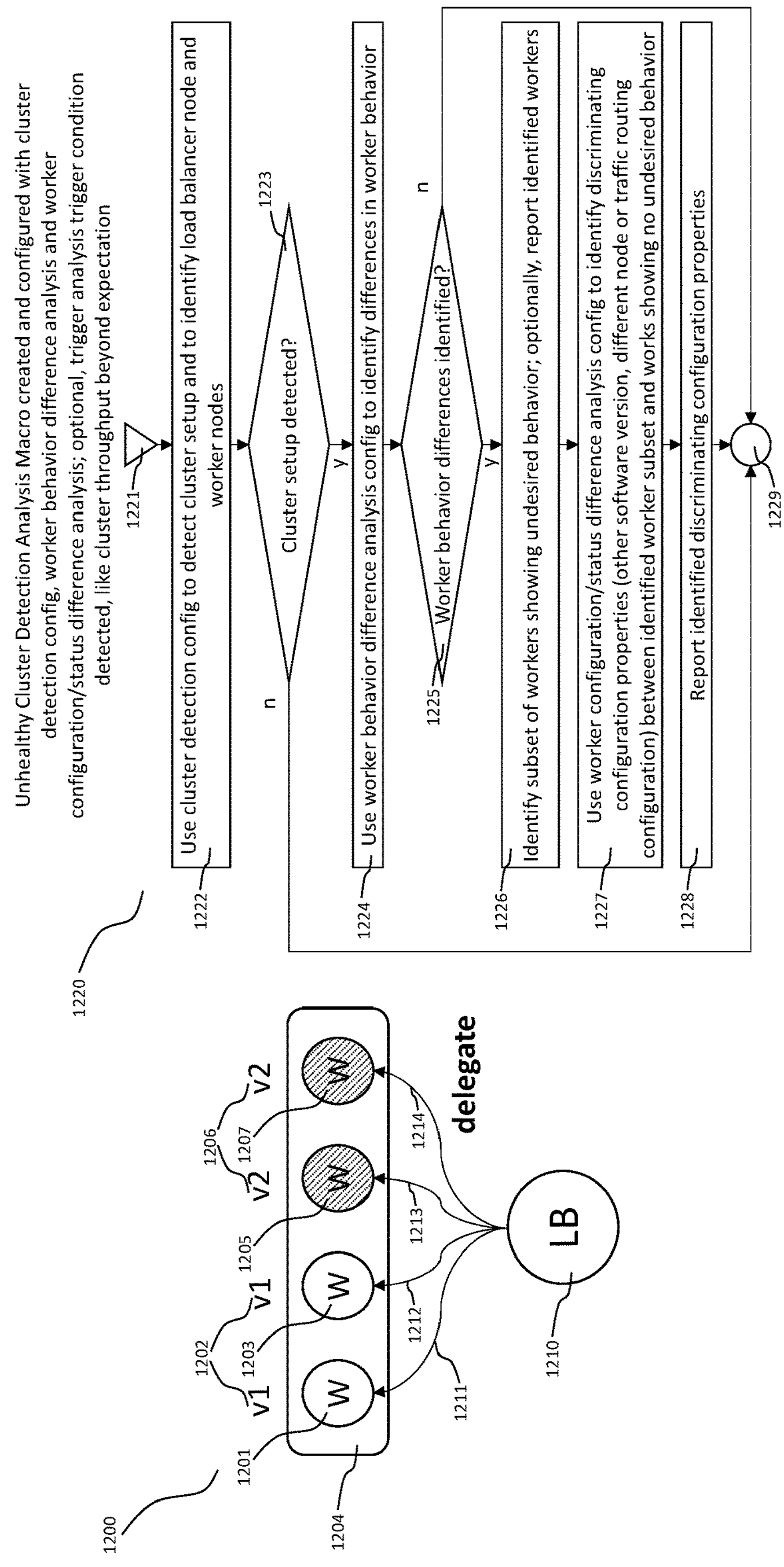

FIG. 13: Exemplary Navigation Macros – "CrashLoopBackOff"
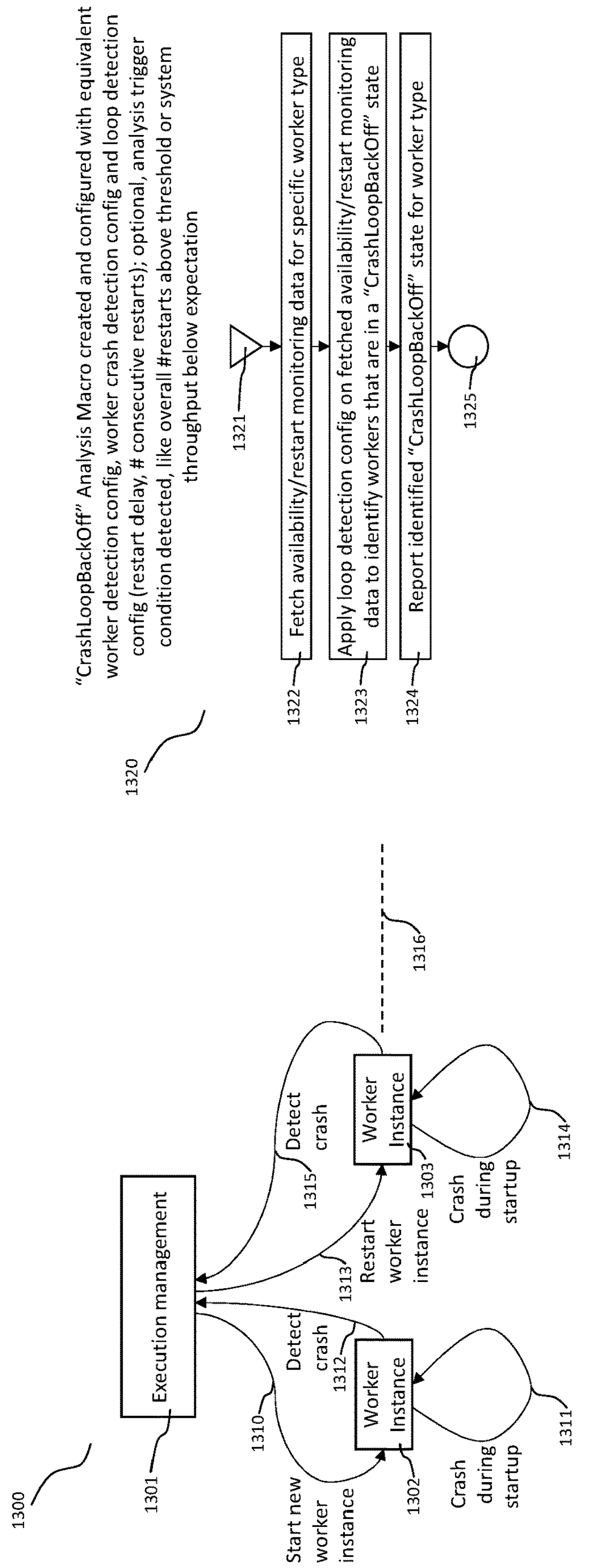

COMPONENT BASED, CUSTOMIZABLE DESIGN ENVIRONMENT FOR COMPLEX ANALYSIS PROCESSES ON MONITORING DATA

CROSS-REFERENCE TO RELATED APPLICATIONS

This application claims the benefit of U.S. Provisional Application No. 63/454,338, filed on Mar. 24, 2023. The entire disclosure of the above application is incorporated herein by reference.

FIELD

The invention generally relates to the field of designing multi-staged analysis processes that operate on semi-structured monitoring data and more specifically to an interactive design approach for multi-staged analysis processes that displays intermediate analysis stage results to an analysis designer, allows the analysis designer to interactively modify analysis steps and that visually presents the impact those modifications have on depending analysis steps.

BACKGROUND

Modern monitoring systems for software applications provide high amounts of monitoring data of various quality, including lower quality, less structured data like application or operating system log data, time series data, e.g., describing resource consumption of monitored application components over time, and highly structured data like transaction traces.

Portions of the monitoring data may be used to create a (topological) model of the monitored environment, and other portions of monitoring data may be used to describe complex, interrelated activities performed in the monitored environment, like the execution of individual distributed transactions.

Highly specialized, monolithic analysis processes analyze performed activities to identify abnormal, undesired behavior, like increased end-user facing error rates or service response times and then use topological knowledge and localized monitoring data to identify conditions that caused this undesired behavior.

Analysis typically consists in interleaved traversal through topology model and analysis of local monitoring data of visited topology element to verify some hypothesis. Therefore, designing and implementing of such analysis processes requires tight interaction of various domain experts, like monitoring system designers which know how to access and interpret monitoring data, data scientists that provide appropriate data analysis and interpretation methodologies and domain experts, which provide knowledge about application component interdependencies and data describing relevant anomalies.

Although such specialized algorithms perform well in general, they may provide suboptimal results in individual environments that deviate from average, standardized environments. Sometimes, minimal adaptations of the analysis process would help to substantially improve the analysis results in such deviating environments, but the monolithic implementation of those analysis processes prohibits such adaptations in the field.

Next to simply adapt existing root cause detection processes to different environments, it is also desired to enable domain experts to create domain and demand specific analysis processes, like analysis processes directed to identify and prioritize vulnerabilities of monitored systems against cyber-attacks. The monitoring system should support the problem-driven, ad-hoc creation of complex analysis processes, where a domain expert, which operates on an already installed version of a monitoring system, extends the monitoring system with analysis processes targeted to new identified analysis problems, without the need to install an updated version of the monitoring system.

Consequently, a design environment for multi-staged analysis processes is required in the art that makes various data access and traversal mechanisms for gathered monitoring data and data analysis methodologies that operate on this monitoring data easily accessible and manipulatable for domain experts, without requiring detailed, implementation level knowledge about data access or data analysis processes. In addition, the envisioned design environment should enable domain experts to combine various topology traversal and local analysis modules to create more complex, multi-staged analysis processes. For fast development loops, results of intermediate analysis steps, and the impact that changes of the analysis chain have on those intermediate results should be visualized to analysis process designers in an easily intelligible way.

This section provides background information related to the present disclosure which is not necessarily prior art.

SUMMARY

This section provides background information related to the present disclosure which is not necessarily prior art.

The present disclosure is directed to an interactive development and execution environment for modularized, chainable analysis systems that operate on semi-structured monitoring data.

Some embodiments of the proposed technology may provide a set of atomic, parameterizable analyzer modules with pluggable interfaces. At least two subgroups of atomic analyzers may exist, a first subgroup containing analyzer modules dedicated to performing traversals through monitoring data locations, as e.g., described in a topology model of a monitored application, and a second subgroup of analysis component dedicated to performing monitoring data analyses on specific locations. The analyzer modules may communicate and interact with each other. As an example, analysis modules dedicated to traversal tasks may provide location data to local data analyzer modules dedicate to the analysis of monitoring data for a specific location, and local data analyzer modules may provide analysis result data to traversal analyzer modules, which make traversal decisions based on the received analysis results.

Some embodiments may provide an analysis composition language (ACL) for configuring and connecting atomic analysis modules and to specify composite analysis modules which may be used in higher-order analysis compositions.

Alternative embodiments may in addition provide an interactive analysis composition environment that enables analysis designer to test, debug and tune their composite analyzers by adapting configuration data of analysis modules or by exchanging whole analyzer components. The interactive composition environment presents the impact that such changes have on downstream analyzing steps to the analysis designer.

Intermediate result data provided by atomic analysis modules may also presented to users of complex analysis chains to explain final analysis results of those complex chains.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides a block diagram of a monitoring system capable to operate composed analysis processes based on atomic analysis components. Composed analysis processes may be defined and stored, similar to user-specific configuration data managed by users of the monitoring system, whereas atomic analysis components constitute inherent parts of the monitoring system. Updating, changing, adding, or deleting atomic analysis components require an update of the monitoring system.

FIG. 2 shows the relationships between roles and tasks that are involved into the development of complex analysis processes. It also illustrates how a modularized, interactive analysis process composition functionality helps to reduce complexity of design and development of multi-layered, composite analysis processes.

FIG. 3 conceptually describes a trigger event generator analyzer component, which may be used by some analysis processes to continuously observe portions of a monitored environment to detect abnormal operating conditions, which may trigger the execution of a detailed, multi-staged analysis process.

FIG. 4 provides a block diagram of a traversal or visit analyzer component, which uses topological or structural connections of dependencies between components of a monitored environment to traverse between those components according to their connections.

FIG. 5A conceptually describes a topology local analyzer component which gathers and analyzes monitoring data for a specific topology component according to its configuration and provides an analysis result.

FIG. 5B provides a flow chart that conceptually describes the analysis activities performed by a multi-staged analysis process, including the transition from one analysis stage to the next one.

FIG. 6 provides a state-diagram like visualization of a multi-staged analysis process directed to the analysis of execution performance or functionality related anomalies.

FIG. 7 shows a state-diagram like visualization of an analysis process directed to the identification of cyber-attack vulnerabilities of a monitored environment.

FIG. 8A provides a block diagram of a monitoring system, similar to the one contained in FIG. 1, which in addition contains a development environment for composed analysis processes, which supports users of the monitoring system to design, test and maintain their custom composed analysis processes in tight relation with their production environment.

FIG. 8B conceptually describes the interactive analysis process composition in view of different layers of the monitoring system and acquired monitoring data that are involved in the process.

FIG. 9A and FIG. 9B provide flowcharts describing the creation of a new composed analysis process and the update of an existing one.

FIG. 10 depicts components and structure of an analysis composition language, which may be used to describe and specify composed analysis processes.

FIG. 11 provides a conceptual visualization of a composed analysis process, containing a composed sub-analysis process which is based on various atomic analysis components.

FIG. 12 shows an exemplary analysis process macro dedicated to identifying unhealthy/unbalanced load balancer situations.

FIG. 13 introduces an analysis process macro directed to detecting reboot-loop conditions in automated execution environments.

DETAILED DESCRIPTION

Example embodiments will now be described more fully with reference to the accompanying drawings.

The disclosed embodiments are directed to an interactive development environment for complex, multi-staged analysis processes of monitoring data that is based on a set of atomic base analyzer components and a composition mechanism directed to define coupling and interaction of atomic and composed analyzer components to define customized, application tailored analysis processes. Analysis components provide interfaces to display and manipulate their configuration and interfaces that provide visualization data for created analysis results. An interactive analysis process development environment may use the configuration interfaces to provide interactive configuration manipulation interfaces and may use the result visualization data to visualize the impact that configuration changes have on analysis results. As analysis components may be coupled and chained in a way that a first analyzer creates analysis results which are used as input for a second analyzer, the interactive analysis process development environment may also visualize the impact that configuration changes have on all downstream or depending analyzer components.

An additional goal of the disclosed technologies is to separate responsibilities and concerns that are involved in the creation of multi-staged monitoring data analysis processes. Traditionally, such analysis processes are developed by highly specialized developers which need experience in fast and efficient access of stored monitoring data, knowledge about topological models describing monitored environments and mechanisms to navigate those models, experience in statistical, data science and machine learning mechanisms to analyze specific portions of monitoring data and domain expertise of the field to which the to be designed analysis process is directed, to identify and combine appropriate data access, navigation and data analysis mechanisms. The proposed analysis process development approach separates those concerns by the provision of atomic basis analysis components for generic but configurable topology data traversal and data analysis components. Atomic analyzers directed to the analysis of specific portions of monitoring data may be developed and provided by data science, statistics or machine learning specialists, and atomic analyzers directed to monitoring traversals may be provided by engineers that are experts in the interaction with monitoring and topology data storage facilities of the monitoring system to realize fast and efficient access and interpretation of monitoring and topology model data. Those engineers may also be responsible for the design of an analyzer composition language and an interactive analysis process development environment.

The design and development of application specific, problem or domain specific multi-staged analysis processes out of existing, generic, and configurable analysis components may then be performed, potentially in the field, by experts of the respective application and analysis domain.

Coming now to FIG. 1, which shows a block diagram of a monitoring system that provides a production area, in which complex, composed analysis processes are applied on real monitoring data. The monitoring data may be acquired from a monitored environment 100 via monitoring agents and APIs 101. The complex analysis processes may first be developed and evaluated in a development area before they are transferred to a production area. Aspects of the development area are described in more detail in FIG. 8B.

A monitored environment 100 contains agents or APIs (Application Programming Interfaces) 101, which provide monitoring data in form of scalar measurement data 102, transaction trace records 103 or topology records 104, which describe resource usage of the monitored environment, performed transaction execution activities, and the topological structure of the monitored environment. Agents may be deployed by the monitoring system to host computing systems, processes, or other components of the monitored environment to acquire and report otherwise inaccessible monitoring data, whereas APIs represent interfaces already present in the monitored environment to access monitoring data describing various conditions and states of the monitored environment.

A monitoring server 110 receives the monitoring data provided by agents/APIs, stores the monitoring data in a monitoring data storage 111, and creates 112 a topology model 113 of the monitored environment 100 using the received topology records 104 and other monitoring data, including scalar measurements 102 and transaction records 103.

The monitoring server provides functionality to analyze monitoring data and topology model in a production area 120. The analysis functionality is provided in form of composed analysis modules 121 that are formed by sequences or networks of interconnected analysis components. A composed analysis module may contain atomic analysis components that provide fundamental monitoring data analysis or topology traversal functionality, configuration data for the contained analysis components and connection data specifying how the analysis components of the composed analyzer are connected and how they interact. A composed analysis module may also contain other, nested composed analysis modules which are embedded in the analysis network of the enclosing composed analysis module like atomic analysis components.

An atomic analyzer repository 129 may be maintained by the vendor of the monitoring system and contain the atomic analysis modules 131 that are referred and used 128 by composite analyzers. Typically, a human and/or machine-readable notation 1000 (for details see FIG. 10) of a composed analyzer process is stored in composed analyzer repository 126. These notations may be created by the users of the monitoring system, either manually or with support by a dedicated development system for composed analysis processes, for details see FIGS. 8-9. Composed analyzer notations contain references 128 to atomic analyzer components 131. Those atomic analyzer components provide generic analysis functionality, in form of executable code, like the ability to analyze time series data for anomalies, or the ability to traverse through a topology model of the monitoring system, and configuration interfaces to adapt those generic functionalities to concrete, specific analysis tasks.

In addition to references to atomic analyzer components, composed analyzer process notations may also contain configuration data for atomic analysis components and data describing the interaction of different atomic analysis components.

When a composed analysis process notation is selected for execution 127, an analysis processing environment or analysis processor (not shown) may interpret and execute the selected composed analysis process notation. This interpretation and execution also include the identification of atomic analysis components referred 128 in the composed analysis process notation. The identified referred atomic analysis components may be selected, configured, and executed 132 by the analysis processing environment.

Existing atomic analyzers may be updated, or new atomic analyzers may be added 130 to the atomic analyzer repository by the monitoring system vendor. Those atomic analyzers may either be referred and used directly by composed analyzers, or indirectly by referring and using nested composed analyzers which in turn refer and use atomic analyzer components.

A composed analyzer 121 may contain a traversal analyzer component 122 (either atomic, or nested composed analyzer) and a local analyzer component 123 (also either atomic or nested composed), which interact in form of sending topology location data 124 from the traversal analyzer 122 to the local analyzer 123 and sending local analysis result data 125 from the local analyzer component to the traversal analyzer 122. To perform topology traversals and to provide topology location data, the traversal analyzer component 122 may access 115 the topology model 113, and to perform local analyses, the local analyzer component 123 may access and read 114 monitoring data from the monitoring data storage 111. Traversal and local analysis components may perform an iterative and interleaved analysis process consisting of multiple traversal and local analysis steps. This iterative analysis process may be terminated and generate an analysis result, either if no further topology traversal paths for subsequent traversal steps performed by the traversal analysis component are available, or if the results of local analyses performed by topology local analysis components on topology locations indicated that no further traversal is required.

One or more composite analyzers stored in the repository 126 may be selected 127 for execution in the production area. This selection may be performed in various ways. As a first example, a user of the monitoring system may manually select a specific composite analyzer and apply it on a selected set of monitoring data. Alternatively, incoming monitoring data may be continuously and automatically observed to identify situations that indicate unexpected or undesired operating conditions of a portion of the monitored environment. In response the detection of such a situation, an appropriate composite analyzer may be automatically selected and applied to the incoming monitoring data for a deeper and more detailed analysis.

Referring now to FIG. 2, which explains different responsibilities and concerns of roles of persons involved in the creation of complex, multi-phased analysis processes for monitoring data. Known application monitoring systems use a monolithic approach for design and development of monitoring data analysis functionality. To develop such a monolithic analysis module, development personnel with a wide range of expertise is required, including data analysis/data science skills, knowledge about the domain of monitored application specific analysis problems, and monitoring system specific expertise for fast efficient access and interpretation of monitoring and topology data collected, created, and provided by the monitoring system.

Modularizing the analysis process by at least splitting it into modules dedicated to topology traversals and modules dedicated to performing topology local analyses of monitoring data, and designing those modules to be parameterizable and interconnectable, creates smaller, more focused work packages which can be processed by development personnel with more focused and specialized skill sets. This modularization creates three different, mostly separated dimensions of concern 200. The first dimension relates to the efficient access of monitoring data configuration and connection of analysis modules 204. The second dimension concerns the analysis of specific subsets of monitoring data, e.g., to identify anomalies in the monitoring data 205. The third dimension relates to the creation of analysis module networks and the parametrization of those networks according to the requirements of a specific analysis problem in a specific monitoring environment 206.

Analysis framework developers 201 may be responsible to define and implement the interfaces of atomic analysis components to interact with each other to exchange analysis results and with the monitoring system to access monitoring and topology data on which analyses are executed. They may also be responsible to implement topology traversal functionality and configuration interfaces for atomic analysis components, including configuration interfaces to define interactions between analysis modules.

Data analysis specialists 202 may develop analysis algorithms for monitoring data to identify and quantify similarities and dependencies between different portions of monitoring data, like monitoring data timeseries, to identify abnormalities in monitoring data timeseries and the like.

Domain specialists 203 may use analysis modules provided by the monitoring system to create domain-specific analysis functionalities. They may select atomic analysis modules, configure, and connect them according to the requirements of a specific monitoring target.

Although those three groups of developers and specialists work in separated problem domains, there is some interference between those groups, mostly due to demand for new, domain specific analysis or traversal functionality.

Domain specialists 203 may articulate demands for new traversal functionality 209 to analysis framework developers and demand for new domain specific monitoring data analysis functionality 208 to data analysis specialists 202.

Analysis framework developers 201 and data analysis specialists 202 may cooperate 207 to develop new data analysis functionality and encapsulate them into composable atomic analyzers.

Three types of atomic analyzers 131 are introduced in the following section of this document. It should be noted that the presented atomic analyzers are only examples, selected to best explain the concept of atomic, compositable analyzers, they do not represent a complete list of possible atomic analyzers. Various variants of those atomic analyzers and other types of atomic analyzers may be used to create networks of interacting, specialized analyzers components, which in cooperation resolve complex, multi-staged analysis problems.

FIG. 3 describes a trigger event generator analyzer component 300, which may be used to continuously analyze specific portions of received monitoring data to determine conditions that require a more detailed, in-depth analysis.

A trigger event generator analyzer component 300 may contain configuration data 301, which specifies and filters monitoring data that is considered by the analyzer, in form of a topology filter 302, which specifies the portions of the topology model which are observed by the analyzer and in form of an analysis data filter 303, which specifies a subset of monitoring data that is considered by the analyzer, and an analysis type and parameterization section 304, which specifies the types of analyses performed by the analyzer and values of parameters for those analyses. In a simplified example, a topology filter 302 may select topology entities of the type "process", and an analysis data filter 303 may select metric time series of type "CPU usage". Using this configuration, the analyzer may fetch metric time series of type "CPU usage" from topology entities of type "process". A basic analysis type and parameterization configuration may specify "threshold exceed test" as analysis type, and the value "80%" as parameters. According to this analysis configuration, the analyzer may identify and report processes having a "CPU usage" that exceeds 80%. The configuration data 301 of a trigger event generator may also be referred to as trigger data.

A trigger event generator component may interact with topology model 113 and monitoring data repository 111 managed by the monitoring server 110 according to topology filter 301 and analysis data filter 302 configuration to query analysis data input 308.

The trigger event generator component applies monitoring data analyses according to its analysis type and parameterization configuration 304. The analysis results may be provided by the trigger event generator in form of visualization data 309 and observation events 310. Visualization data 309 may be used to display the results of performed analyses to a user of the monitoring system or to an analyzer designer. As an example, visualization data may identify those topology entities on which analyses executed according to the analysis configuration 304 indicated suspicious metric data. This visualization data may e.g., be used to create a visualization of the topology model of the monitored system in which the topology entities which satisfy the conditions of the trigger event generator are highlighted.

Observation events 310 may be used to trigger subsequent analyses, performed by other analysis components, to identify further details describing or explaining the trigger conditions detected by the trigger event generator 300.

An observation event record 310 may contain but is not limited to topology location data 311, which identifies the topology entity on which the event was observed, timing data 312 specifying when and for how long the event was observed, and observation artifact data 313 defining type and further descriptive data for the observed event. Following above example, observation artifact data may specify that CPU usage of 85% was observed.

The observation event 310 may be emitted by the trigger event generator using a "navigation start" event interface. This "navigation start" interface may be routed to subsequent analyzer components according to analyzer interconnection configuration.

Trigger event generator components may cyclically (e.g., every 1, 5, 10 minutes) perform queries for topology model data and monitoring data, according to their topology filter 302 and analysis data filter 303 configuration and analyze the queried data according to their analysis configuration 304. Created observation events 310 may automatically trigger subsequent analysis steps, which may eventually create notifications informing users of the monitoring system about the results of those subsequent analysis steps.

Alternatively, users of the monitoring system may manually analyze monitoring data to identify suspicious portions of monitoring data. Identified suspicious monitoring data may be manually marked by a user of the monitoring system and sent to specific composite analyzer for detailed analysis. As an example, a portion of a metric timeseries showing undesired behavior (e.g., CPU usage exceeding 80%) may be selected by a monitoring system user and sent (in form of an identifier for the topology entity on which the CPU usage data was observed, an indicator for the metric type "CPU usage", and data for the time period during which the suspicious behavior was observed) to a composite analyzer 121 for a more detailed analysis.

Coming now to FIG. 4, which conceptually describes an atomic topology dependency analyzer component, which may perform traversals through a topology model of a monitored application. As examples, topology dependency walker components may be configured to follow functional dependencies, like service call dependencies, or to follow resource sharing or technology stack dependencies, like dependencies describing which services are provided by which processes, or which processes are executed on which host computing systems.

A topology dependency walker analyzer component may contain a "navigation start" analysis hook 403, which may be configured to receive observation events 310. Those observation events may be received from trigger event generators, or they may be received from other topology event analyzers in case the topology navigation performed by the other topology event analyzer is exhausted, and another type of topology navigation is required for a continued analysis.

Further, a topology dependency analyzer may contain an interface 404 to send analysis request events 410 and an analysis hook 405 to receive analysis result events 420, to communicate with analysis components that perform topology local analysis tasks.

An analysis request event 410, which may be sent via the analysis "topology local analysis" event interface 404, may contain but is not limited to topology location data 411, identifying the topology element on which the analysis should be performed, like a specific process or host computing system, and analysis input data 412, e.g., specifying identifiers for one or more metric time series, and time selection data, specifying a time period for which metric data should be considered for analysis.

An analysis result event 420, which may be received via the "topology local analysis result" hook 405 may contain but is not limited to analysis result data 421, specifying the outcome of a requested analysis.

The analysis result event 420 may be evaluated by the topology dependency walker 400 to determine whether the topology walk can be continued or should be terminated. In case the topology walk can be continued, the topology walker analyzer may continue to the next topology entity and then use the topology local analysis interface (404 and 405) to request a topology local analysis for this next topology entity. Otherwise, the analysis component 400 may issue an observation event 310 via its "navigation exhausted" interface. This observation event 310 may be received by the "navigation start" analysis hook of another topology dependency walker component 400. As an example, if a requested topology local analysis for a given topology entity indicated an anomaly, but topology local analyses for all topology entities to which the topology walker analyzers can traverse from the given topology entity indicate no anomaly, then an observation event 310 may be issued on the "navigation exhausted" interface 406, for the given topology entity.

A topology dependency walker component 400 may contain configuration data defining the type of performed navigation, e.g., in form of types of topology entities and connections that should be followed and in form of a traversal direction. In addition, traversal limitations may be specified, like a maximum number of traversal steps, also referred to as "hop count". As an example, traversal type may specify that topology connections of the type "service call" may be followed between entities of type "service", and that the "service call" connections may be followed in call direction (i.e., from calling service to called service). A "hop count" may specify the maximum number of "service calls" that should be followed. A topology dependency walker analyzer may also issue a "navigation exhausted" event if the number of performed navigation steps exceeds the configured maximum hop count.

A topology dependency walker may access 407 the topology model 113 to perform its navigation steps and it may further provide visualization data 408, describing performed navigation steps. The visualization data may be used to mark visited topology nodes and edges in a visualization of the topology model.

A topology location analyzer component 500, which may be used to perform analyses for specific topology elements is shown in FIG. 5A.

A topology location analyzer may be triggered by an analysis request event 410, which it receives via an "topology local analysis" hook interface 504. Receipt of an analysis request event may cause the topology location analyzer to fetch monitoring data for analysis according to the analysis input data 412 specified in the received analysis request event from the one or more topology elements specified in the topology location data 411 section of the received analysis request event 410. The result of the performed analysis may be reported by the topology location analyzer via a local analysis result interface 505 in form of an analysis result event 420. The analysis result event 420 may contain analysis result data 421, describing the outcome of the requested analysis and optional additional data further describing aspects of the situation observed on the targeted topology location that led to the analysis decision.

A topology location analyzer component 500 may contain configuration data 501, which specifies filters 502 for the monitoring data that should be considered for the analysis, and analysis configuration data 503 specifying the type of analysis that should be performed and parameters for the selected analysis. As an example, analysis data filter may identify and specify input data by the type of monitoring data that should be analyzed (e.g., CPU or memory usage of a process, response times of a service, or used network bandwidth for a network connection) or by its statistical qualities, e.g., plain time series data or quantile data describing the statistical distribution of monitoring data. Analysis type and parameter configuration data 503 may e.g., define that a moving average should be calculated for a specific time series as reference value and that the window size of the moving average should be 5 minutes. The analysis type and parameter configuration may further define that another moving average value should be calculate for the specific time series as base line value, where the time window for the base line moving average is before the time window for the reference value. Further configuration data may specify a threshold for a relative difference between reference value and base line value. An analysis result event record indicating an anomaly may be generated in case the relative difference exceeds the threshold. Otherwise, a result event record indicating normal operating conditions may be generated.

The topology location analyzer 500 may access 506 the monitoring data repository 111 to fetch the monitoring data that is required for requested analyses. It should be noted that it is assumed that monitoring data is tagged with topology location data for the topology location on which the monitoring data was recorded. Therefore, it is not required for the topology location analyzer 500 to access the topology model 113 to identify the required monitoring data.

The topology location analyzer 500 may also create visualization data 507 describing its analysis results, e.g., in form of time series charts optionally containing visualization data for identified abnormal or unexpected behavior, like change points or threshold violations of time series. A change point for a time series specifies a point in time for which the time series data from before the point in time differs from the time series data from after the point in time with statistical significance.

As already noted, the three described atomic analyzer components do not represent an exhaustive list of possible atomic analyzers. They only represent a small exemplary subset of possible atomic analyzer components that may be used for causal analysis tasks of monitoring and topology data. Various other types of atomic analyzers may be created and used for the causation use case. In addition, other atomic analyzer components may be created for other analysis use cases, including but not limited to security or to business related analyses.

Regardless of its analysis purpose, an atomic analysis component requires interfaces to access and fetch monitoring and/or topology data on which a specific, focused analysis task is performed, interfaces to receive analysis requests from other analyzer components, to report analysis results to other analyzers, and interfaces to provide visualization data describing the analysis results. In addition, atomic analysis components may provide means to set and store configuration data that defines and parameterizes the analysis tasks performed by the atomic analysis components.

Configuration data 301, 401 and 501 for individual analysis components, and also configuration data defining the wiring and interaction of individual analysis components may be defined and provided by users of the monitoring system to create analysis processes that are tailored to their specific analysis tasks. This configuration data may be stored in form of one or more analysis composition units, which may contain the configuration data in human- and/or machine-readable form. For a more detailed description of such analysis composition units and a proposed exemplary structure for such analysis composition units please refer to FIG. 10. An interactive analyzer composition environment (for details see FIG. 8A) may be provided by the monitoring system to support monitoring system users in the creation, configuration, and maintenance of composite analysis components.

Referring now to FIG. 5B, which conceptually describes the execution of a multi-staged analysis process as performed by the components of a composite analyzer. It describes the interaction between a pair of analyzer components that perform an analysis related to a first analysis stage, the determination that the analysis related to the first stage is exhausted and, in response to an exhausted analysis of the first stage, switches to a second pair of analyzers that perform the second stage of the analysis.

The process also includes the transfer of analysis results from the first stage that are related to the determination that the first stage is exhausted, as initial input for the second stage of the analysis.

The process 550 starts with step 551, when an observation event describing the situation of an unexpected situation on a specific topology entity is received by a composite analysis component.

Following step 552 prepares data describing the received observed unexpected situation and the topology location of the observation for the usage by the analysis process as current topology location/entity and as current unexpected situation. Current topology location and current unexpected situation may be read and updated during the analysis process. Step 552 may also set the topology walk analyzer that is configured for the first stage of the to be performed analysis as active topology walk analyzer.

In subsequent step 553, the active topology walk analyzer 400 for the first analysis stage selects potential traversal target topology entities from topology model by selecting topology entities that are accessible from the current topology location (which was previously set by step 552) under the traversal limitations 402 configured for the topology walk analyzer.

As an example, a topology walk analyzer may be configured to follow topology dependencies of type "service call dependency" in call direction (i.e., from calling service to called service). With this configuration, the topology walk analyzer may, from a specific topology entity representing a service, which receives calls from incoming services, sends calls to outgoing service and that is provided by a specific process, only follow outgoing service call dependencies to identify potential traversal targets. It may not follow service call dependencies to incoming services, and it may not follow the technology stack dependency to the process providing the service.

If no potential traversal targets are found in step 553, subsequent decision step 554 continues with step 558, which switches the analysis step to the subsequent analysis stage.

Relating back to the example of the topology walk analyzer configured to follow service call dependencies in call direction, this situation occurs when the current service calls no other service. An abnormal situation observed on the current service can therefore not be caused by other services that are called by the current service, because such services do not exist. As a consequence, the cause for the abnormal situation must be located in the current service, or components providing the current service. The second analysis stage, which is triggered by step 558 and following, performs this "service local" analysis for the current service.

If step 553 identified at least one potential traversal target, decision step 554 continues the process with step 555, in which the active topology walk analyzer interacts with its linked topology local analyzer 500, to request anomaly analyses for the potential traversal targets identified in step 553. In step 555, the topology walk analyzer may send an analysis request event 410 for each potential traversal target to its linked topology local analyzer, and the topology local analyzer may perform an analysis for each potential traversal target. The respective analysis results are sent back to the requesting topology walk analyzer in form of analysis result events 420. Potential traversal targets for which an undesired situation was identified by the topology local analyzer are selected as valid traversal targets, as, due to the existence of an undesired situation on those services, a traversal to them is desired and valid for the continued analysis process.

Coming again back to the service call dependency example, the topology walk analyzer would request anomaly analyses for all services called by the current service.

Subsequent decision step 556 may then determine whether at least one valid traversal target was identified in step 555 and continue the process with step 558 if no valid traversal target is available.

For the service call dependency example, no existing valid traversal targets indicates that the current service may have called one or more other services, but none of the called services show an abnormal situation that would justify an analysis of those called services. This also indicates that the cause for the abnormal situation on the current service is related to the current service and the components providing it. A detailed analysis of those components may be performed in the second analysis stage triggered by step 558 and following steps.

Step 557 is executed if at least one valid traversal target was found in step 555, in which the active topology walk analyzer performs a traversal to each of the identified traversal targets and starts a subsequent analysis for each of those valid traversal targets. Step 557 may, for each valid traversal target set its topology location as the current topology location, and the abnormal situation identified for the valid target topology location as current abnormal or unexpected situation. Step 557 may then forward the execution of the analysis for each valid traversal target to step 553 for a continued analysis in the current analysis stage. Analysis of different valid traversal targets may either be performed sequentially or in parallel. The existence of multiple traversal targets causes the analysis process to split into different branches which are all followed and analyzed.

Decision step 558, which is executed when a currently ongoing analysis stage detected a situation where subsequent analysis steps for the current analysis step are not possible, determines whether a subsequent analysis stage is configured for the currently executing composite analysis component.

If no subsequent analysis stage is defined, decision step 558 continues with step 560, which provides the overall results and findings of the performed analyses. The process then terminates with step 561.

If otherwise a subsequent analysis stage is defined for the composite analysis component, step 559 is executed, which selects the topology walker analyzer that is configured for this subsequent stage as active topology walk analyzer. Step 559 may also set current topology entity and current unexpected situation as starting point for the subsequent analysis stage. Afterwards, step 559 continues with step 553 and following steps to perform the subsequent analysis stage.

Coming again back to the service call dependency analysis example, step 559 may switch to a second analysis stage which performs an analysis step directed to the components forming the technology stack of a service that was identified as endpoint of an analysis performed by the first analysis stage.

Coming now to FIGS. 6 and 7, which describe two exemplary complex analysis tasks that that may be performed by tailored composite analyzers.

An analysis task related to identify causal relationships between abnormal operating conditions in elements of a monitored environment is described in FIG. 6.

Such an analysis may be triggered by the detection of an undesired operating condition, like an increased response time 600 on a specific service. A trigger event generator 300 may be configured to constantly monitor response time metrics for a specific set of services. In case of a detected unexpected increase of the response time of such a service, the trigger event generator may create an observation event 310, describing the observed abnormal service response time and its topology location.

This observation event may be routed 601 to a topology walker analysis component 400, which is configured to perform topology walks along service call dependency relationships in call direction. Monitoring data in form of transaction traces may describe the execution of distributed transactions. Those distributed transactions may call services and those services may call other services. The transaction trace data may be analyzed to extract those service calls and to create corresponding service call dependencies in the topology model describing the environment in which those transactions are executed.

The topology dependency walker analyzer may use those service call dependencies to traverse from the service on which the service response time degradation was reported by the trigger event generator to a second service that is called by the service on which the response time degradation was observed.

The topology walker analyzer may then create an analysis request event 410 for a response time degradation analysis of the second service. The analysis request event 411 may contain topology location data 411 identifying the second service, and analysis input data 412 defining the monitoring data that should be considered for the requested analysis. As an example, analysis input data 412 may specify an observation time frame which should be searched for an increased response time of the second service. The analysis request event may be sent 603 to a topology location analyzer 500 configured to identify service response time degradations on the second service. The receiving topology location analyzer may perform the requested analysis according to its configuration 501 using monitoring data as specified in the received analysis request event 410. The result of the performed analysis may be transferred back 605 to the requesting topology walker analyzer in form of an analysis result event 420.

Based on the analysis result, the topology walker analyzer may either traverse to the next service that is reachable according to its traversal configuration and request a topology local analysis for this next service, if the analysis performed for the second service indicated a response time degradation, or it may issue 606 an observation event 310 indicating an exhausted navigation, if the local analysis for the second service revealed no response time degradation.

The observation event indicating an exhausted navigation may contain topology location data identifying the last service on which a response time degradation was observed. This observation event may be sent to a second topology walker analyzer 607 configured to perform topology searches along vertical topology dependencies.

Entities of a topology model may describe different technological levels of abstraction of a monitored environment. A first level may describe the services provided by the monitored environment and the call dependencies of those services. A second level may describe the processes that are executed by the monitored environment and a third level may describe the host computing systems contained in the monitored environment. The topology model may also describe relationships between entities of those levels, like relationships indicating which process provides a specific service or on which host computing system a specific process is executed. Those relationships may also be referred to as vertical relationships or vertical topology dependencies. The second topology walker analyzer may be configured to traverse down those vertical topology dependencies, e.g., from services to processed providing those services and from processes to host computing systems executing those processes. The second topology walker analyzer may interact with a topology location analyzer 609 configured to identify abnormal operating conditions on a specific topology entity that is related to the provision of a service on which a response time degradation was observed. Such specific topology entities include the process providing the service and the host computing system on which the process providing the service is running.

On receipt of the observation event indicating the exhausted service call dependency navigation 606, the second topology walker analyzer 607 may traverse, following a vertical topology dependency, from the service on which the response time degradation was observed, to the process providing this service. The second topology walker analyzer may then create an analysis request event 410 to identify abnormal operating conditions on the process and send it to a second topology local analyzer 609 configured to identify abnormal operating conditions on processes and host computing systems. The second local topology analyzer may perform an analysis to identify abnormal operating conditions on the topology entity identified in the received analysis request event and return 610 the result of the analysis in form of an analysis result event 420. The second topology walker analyzer may, depending on the received analysis result, traverse from the topology entity representing the process providing the service to the topology entity representing the host computing system running the process and request an anomaly analysis of the host computing system from the second topology location analyzer 609.

The rationale of the analysis process proposed in FIG. 6 is, for an observed response time degradation of a specific service to first identify those other services that the specific service calls that also show a response time degradation, as those response time degradations are most probably causing the response time degradation of the specific service. If this recursive search can no longer identify called services that also show a response time degradation, the search strategy is changed to identify, for the last service in the service call chain for which a response time degradation was detected, local conditions that may have caused the response time degradation of this service. This search may be performed on topology entities forming the vertical stack of the service, like the process providing the service and on the host computing system running the process.

Coming now to FIG. 7, which describes an example of a composite analyzer that may perform security/intrusion vulnerability analyses of a monitored environment.

Most modern computing environments follow a service-oriented architecture where a set of independently operating, loosely coupled services provide functionality that is accessible by external customers of the computing environments via externally accessible interfaces. Not all the internal services that are deployed to a computing environment may be exposed to external access.

Some of those services may be affected by vulnerabilities, which are either caused by low-quality code of the service itself, which makes them vulnerable, or by the usage of libraries that contain vulnerable code sequences. However, mere existence of vulnerable code in a service does not mean that the computing environment to which the service is deployed is vulnerable. Prerequisite for this potential vulnerability of existing vulnerable code to become an actual vulnerability include first the execution of the vulnerable code and second the possibility to control this execution from an external, untrusted location.

The analysis proposed in FIG. 7 starts with an analysis of service code via a trigger event generator 700 that identifies vulnerable code that is contained in a deployed service version. This code analysis may be executed on events that indicate service code changes, like the deployment of new service versions. The analysis may include scanning the newly deployed code for code patterns that indicate a vulnerability. Further, use identification and version data for libraries used by the newly deployed service may be analyzed to identify known vulnerabilities of those libraries.

In case vulnerable code is identified, the trigger event generator 700 may create and send 701 an observation event 310 containing topology data for the process in which the vulnerable code is loaded. The observation event 310 may be received by a topology walker analyzer 702 configured to traverse the topology stack upwards (from a process to services provided by the process).

The topology walker analyzer 702 may operate on monitoring data in form of transaction trace data describing transaction execution activities performed by processes. Such transaction trace data may be generated by agents and sensors instrumented into monitored processes by the monitoring system. The sensors and agents may detect incoming requests received by the monitored process via service interfaces and then trace the processing of those requests through various portions of code that are executed by the receiving process. Therefore, transaction traced data links requests that are received via a specific service interface of a process with the code that is executed by the process to create responses to these requests. Consequently, transaction trace data also links services with code that is executed to respond to requests received via those services. The topology walker analyzer 702 may analyze transaction trace data to identify for the services that are provided by the process, the corresponding code that is executed to respond to requests received via those services.

Identified code portions are sent 703 to a topology local analyzer 704 in form of analysis requests. The topology local analyzer 704 is configured to analyze whether received code portions are affected by a vulnerability. The code locations indicated by the received analysis requests are analyzed by the topology local analyzer 704 and the respective analysis results are sent back 705 to the requesting topology walker analyzer 702 in form of analysis result events 420.

In case a received result event indicates that processing of requests by a specific service also includes the execution of vulnerable code, the topology walker analyzer 702 may send 706 an observation event 310 identifying the specific service to a second topology walker analyzer 707, which may be configured to traverse service call dependencies against call direction (i.e., from called service to calling service). The second topology walker analyzer 707 may interact with a second topology local analyzer 709, which may be configured for the analysis of entities of the type service to determine whether a given service is accessible from an entity that is not controlled by the vendor of the monitored application. As an example, the second topology local analyzer may first select transaction trace data describing transactions that were at least in part executed by a specific, to be analyzed service. The selected transaction trace data may then be analyzed to detect requests for executions of the specific service that were received from an entity that is not controlled by the vendor of the monitored application and is therefore considered not trustworthy.

The second topology walker analyzer 707 may traverse service call dependencies against call direction and request an access analysis 708 for each visited service from the second topology local analyzer 709. The second topology local analyzer 709 may report 710 the analysis result back to the second topology walker analyzer. The secondary analysis performed in cooperation by the second topology walker analyzer and the second topology local analyzer may either terminate if no more call dependencies to traverse are available, or if the currently visited service is accessible form untrusted entities.

If the analysis ends due to no more available call dependencies to follow, a low-priority vulnerability may be indicated, because the entity affected by the vulnerability is not accessible from outside of the monitored application and can therefore not be exploited by a potential external intruder.

If the analysis ends due to the external accessibility of a visited service, a high-priority vulnerability may be indicated, because the entity affected by the vulnerability is accessible from untrusted entities and can therefore the identified vulnerability can be exploited.

Coming now to FIG. 8A, which provides a block diagram of an enhanced version of the monitoring system described in FIG. 1, which in addition contains a development environment for composed analysis processes that supports users of the monitoring system to create, update and, test their custom composed analysis processes.

The monitoring server may also contain a development area 140, in which users of the monitoring system create new composed analyzers according to new analysis goals, to adapt or fine-tune existing composed analyzers according to changes of the monitored system or changes of the analysis goals, or to analyze, verify, and if required, correct the functionality of existing composed analyzers.

In-development composite analyzers 144, typically also contain traversal 145 and local analysis 146 components which interact by exchanging topology location 147 and local analysis result 148 data. To perform those analysis tasks, also topology data 142 and monitoring data 143 may be fetched by those analysis components. Composite analyzers that are executed in the development area may also select, configure, and execute 154 atomic analysis components 131, as composite analyzers running in the production area do.

In contrast to composite analyzers running in the production area 120, composed analyzers that execute in the development area 140 may fetch and use synthetic topology and monitoring data instead of data describing a real monitored environment 100. Usage of synthetic input data during the development phase of composed analyzers has the advantage that specific, manipulatable, and reproduceable monitoring and topology data situations can be created for testing purposes.

In addition, a visualization and configuration component 153 may operate in the development area which interacts with analysis components (e.g., analysis components 145 and 146) that execute in the development area. Those analysis components may send, 149 and 151, intermediate analysis results, like the topology location that resulted from a traversal step, or the result of a monitoring data analysis performed for a specific topology location, to the visualization/configuration module which presents those intermediate results to an analyzer developer. The analyzer developer may review the intermediate analysis results and compare them with expected results. In case of a deviation between received and expected results, the developer may provide configuration updates (150 or 152) for one or more analyzer components. The visualization/configuration module may trigger a re-execution of the analysis using the updated configuration and present the results of the re-execution to the analyzer developer.

The visualization/configuration module may also provide means to interactively step through an analysis process and to rollback individual analysis steps after application of configuration changes to examine the impact of the configuration changes on intermediate analysis results. The developer may also exchange analysis components 145/146 or change the way those analysis components interact with each other.

After development activities for a composite analyzer module are finished, the analyzer module may be released 141 and stored in a composed analyzer repository 126.

Coming now to FIG. 8B, which conceptually describes an interactive composition and design environment for complex, multi-tiered analysis components. A data layer 800 may provide observation data describing a monitored environment in form of topology 113 and monitoring data 111. Observation data may either be provided by agents/APIs deployed to a real monitored environment, and describe real observations, or they may be created artificially, e.g., to mimic specific operating conditions of a fictive environment.

An analysis execution layer 810 may operate a set of interacting analysis components (e.g., analyzer components 811 to 815), that access (801 to 805) the data layer to perform specific analyses of the observation data to communicate the result of those analyses to other analysis components (816 to 819), e.g., to trigger additional analysis steps. The network of analyzers operating in the execution layer 810, together with configuration data of those analyzers is defined in a composition/configuration layer 830, which may contain an analyzer wiring configuration 831 and analyzer specific configuration data 832 to 836.

A visualization layer 850 provides means to view and manipulate individual analyzer configurations (e.g., 851 and 852) and to manipulate the wiring configuration to add or remove analysis components and to change configuration data defining the interaction of the analysis components.

The visualization layer also provides means to visualize the analysis results in an appropriate form, like for topology walker analyzer components, the visited topology nodes, or for topology local analyzers, visualizations of monitoring data, together with visualizations of applied analysis configurations, like threshold settings.

Users of the analyzer composition environments interact with a user interaction layer 860 to perform updates of analyzer configurations and to verify whether performed configuration updates resulted in desired analysis results via the visualization layer 850.

In the concrete example shown in FIG. 8B, trigger generator 811 fetches 801 topology and monitoring data to determine the existence of abnormal operating conditions for which further analysis is required, according to a specific configuration 832 for the trigger generator component. Identified abnormal operating conditions are forwarded 816 to a topology walker analyzer component 816 according to analyzer wiring configuration 831. Topology walker component 812 accesses 802 topology data to identify target topology entities according to its configuration 833. Identified target topology entities may be forwarded 817 to topology local analyzer 813 according to analyzer wiring config 831. Topology local analyzer 813 may fetch 803 monitoring data for notified target topology entities, perform analyses of this monitoring data according to its analysis configuration 834 and report 817 the analysis results back to topology walker analyzer 812 according to analysis wiring configuration 831. Secondary topology walker analyzer 814 may be notified 818 if the topology walk performed by topology walker analyzer 812 is exhausted, according to the analyzer wiring configuration. Secondary topology analyzer 814 may interact 819 with a secondary topology local analyzer 815 to perform further analyses on topology locations identified and reported by topology walker analyzer 812 and topology local analyzer 813.

A visualization 851 of analysis result created by trigger generator 811 may show a portion of the topology model in form of a graph, where nodes of the graph represent entities of the topology, like host computing systems or processes, and edges of the graph represents dependencies between topology entities, like communication activities or resource dependencies, where nodes representing topology entities on which abnormal operating conditions were identified by the trigger generator are highlighted.

Similarly, the result of the analysis performed by topology walker analyzer 812 in cooperation with topology local analyzer 813 may be visualized 853 in form of a graph of the topology model in which all nodes that represent topology entities that were visited by the topology analyzer are highlighted. Also, configuration data and analysis results of subsequent analysis components 814 and 815 may be visualized 854, details of those visualizations are not shown.

A user of the analyzer composition environment may review the analysis result visualization, and if the analysis result is not as expected, perform an update 861 of the analysis configuration 833 for the topology walker analysis component (note: the user may alternatively or in addition, update the configuration 834 of topology local analyzer 834) via the visualization 852 of this configuration data. The update of the configuration may be notified to the analyzer execution layer 810, which performs a new analysis run of the analyzer affected by the configuration change and all downstream analyzers. In the concrete example, the analyzer execution layer may first apply the configuration change of the analysis configuration 833 of analyzer component 812 and then trigger a new analysis run of analyzer component 812 and all its downstream analyzer components (813 to 815). The new analysis run of analyzer 812 (in cooperation with analyzer 813) may produce new results, which may be visualized 856, together with the updated configuration parameters 855 that led to the new analysis results. The reevaluation performed by downstream analyzers 814 and 815 may also generate different results 839, 840, which may also be visualized 857.

The design goal of the interactive analysis composition environment is to support interactive and intuitive design of complex, multi-layered analysis processes, which instantly shows the impact that changes of the output of a specific element of a complex analysis chain have on all subsequent elements of this analysis chain.

Referring now to FIGS. 9A and 9B, which provide flow charts conceptually describing the creation of new composed analysis components and the update/maintenance of existing composed analysis components.

The creation of a new composed analyzer from scratch is described in FIG. 9A. The process starts with step 900, when a new analysis problem was identified, which can be resolved by a novel type of analysis performed on already gathered/available topology and monitoring data.

An analysis trigger component, or trigger event generator 300 may be selected and configured in step 901. Visualization of intermediate analysis results of the trigger event generator, based on real or synthetic monitoring data, may be used to verify accuracy and correctness of these analysis results.

Subsequent decision step 902 may continue with step 903 if correctness and accuracy of the results provided by the trigger event generator are as expected (e.g., for a given set of monitoring data and a given topology situation, the topology entities on which a trigger situation was detected, and the types of detected trigger situations match expectations). Otherwise, it continues with step 901 to either select another type of trigger event generator, or to adapt the configuration of the selected one.

In step 903, a set of topology walker analyzer components may be presented to the designer of the composite analyzer that matches the type of trigger events generated by the trigger event generator. As an example, if the trigger event generator identifies analysis triggering situations on service entities, only topology walker analyzers may be presented that at least start their topology walk from a service entity. In following step 904, the analysis designer may select one of the presented topology walker analyzers and configure it as desired. The analyzer designer may determine direction of the to be performed topology walk (e.g., for a service dependency walker, if service call dependencies should be followed in or against service call direction), the maximum extend of the topology walk, or filter criteria for the topology entities between which topology walks should be performed (e.g., from service to service, from service to process providing service, or from process to host computing system executing the process).

In following step 905, the analyzer composition system may provide a set of topology local analyzers that match the selected and configured topology walker, and in subsequent step 906 the analyzer designer may select and configure one of the presented topology local analyzers. The analyzer designer may e.g., specify filters for monitoring data that should be analyzed, like filters specifying the names of monitoring data time series that should be analyzed, absolute and relative time periods, defining the time periods from which (time series) data should be analyzed and configuration data for applied analysis methods.

After topology walker analyzer and topology local analyzers are selected and configured, the analyzer designer may, in step 907, use the intermediate analysis result visualization for those analyzers to verify if the combination of topology traversal and topology local analyses created the desired results. The process continues with step 909 if the produced result matches the designer's expectations. Otherwise, the process returns to step 903 to adapt the selection and configuration of the topology walk and topology local analysis components until desired analysis results are produced.

In decision step 909 the analyzer designer may determine whether the results provided by the previously selected, configured, and combined analysis components already suffice the overall analysis goal. In this case, step 911 is executed, which may deploy the created composed analyzer to the composed analyzer repository 126, where it may be used to analyze real monitoring data. The process then ends with step 912.

If otherwise subsequent analysis steps are required on top of the analysis that is performed by the previously selected analyzer components, step 910 is executed, in which additional analysis components are selected and configured to perform the still missing analysis steps. Analysis components selected and configured on step 910 may be appended to the analysis components configured and selected in steps 904 and 906. Appending of analysis components may be performed in a way that analysis results generated by predecessor analyzers are propagated to appended analyzers, which use received analysis result as initial parameters for their analyses. As an example, analyzer components selected and configured in steps 904 and 906 may perform a topology walk along call dependencies of services, where the topology walk is started at a service showing an abnormal behavior (e.g., an increased response time), and is terminated/exhausted when no called service is found which also shows the abnormal behavior. It is most likely that the reason for the abnormal behavior is related to the execution location of the last service of the service call chain on which the abnormal behavior was observed. Therefore, a subsequent analysis of this execution location may be desired. To perform such a subsequent analysis, analysis components that perform an analysis of the vertical execution stack (e.g., process providing the service, host computing system executing the service providing process) may be appended to the analysis components that perform the service call dependency walk analysis. Identity data for the last service on which the abnormal operating condition was detected may be forwarded from the service call dependency analyzer to the execution stack analysis components. A topology walker analysis component which is configured to follow vertical topology connections (e.g., from a service to the process providing the service, to the host computing system executing the process) may be used to identify the process providing the service and other components that are involved in the provision and execution of this service. Specific topology local analyzers may be used to identify abnormal operating conditions on topology entities representing components of the vertical stack of the service.

In step 910, multiple downstream analysis steps may be defined and appended to an analysis chain. Step 911, which deploys the composed analyzer component to the composed analyzer repository 126, is executed after step 910 is finished.

The process to update an already existing composite analyzer, after an identified malfunction, or to adapt the analyzer to new analysis goals, is shown in FIG. 9B.

The process starts with step 920, when an incorrect, incomplete, or no longer appropriate analyzer was identified. Following optional step 921 may create a working copy of the previously identified analyzer. This step may be executed when the identified analyzer should remain in operation during the update/maintenance work. Step 921 may create a copy of all configuration data for the identified analyzer in a way that the created copy may be used to create and operate a separate instance of the identified analyzer. A separate composed analyzer repository (not shown) may be available in the development area to store working copies of analysis processes that are in development.

In following step 922, an analyzer designer may identify one or more components showing incorrect or undesired behavior and replace or reconfigure them.

Afterwards, the analyzer designer may, in step 923 use the intermediate result visualization (see e.g., intermediate results 851, 853 and 856 in FIG. 8B) for those changed analyzer components to determine whether the composite analyzer now has the desired functionality. If downstream analysis components exist, the analyzer designer may also consider intermediate result visualizations of those.

Decision step 924 continues the process with step 922 if the desired new behavior of the composite analyzer is not yet reached and further adaptations are required.

Otherwise, the process continues with step 925, in which the updated analyzer may be deployed to a production environment to analyze and interpret real monitoring data. In case a copy of the original analyzer was created in step 921, step 925 may either replace the original analyzer by the updated one if the original analyzer is no longer required. Otherwise, step 925 may deploy the new analyzer side-by-side with the original analyzer and assign another name or version number to the new analyzer to make it distinguishable from the original one. The process then ends with step 926.

Referring now to FIG. 10, which describes the structure of a scripting language for the definition and storage of composed analysis components.

A single script file may represent a "composition unit" 1000, which defines and identifies one analysis component and its relations to other analysis components. Such a composition unit may contain but is not limited to an identifier 1001, which uniquely identifies the analysis component defined in the "composition unit" and a main analyzer section 1002, which contains configuration data for the to be defined analyzer and its relation to other analysis components.

The main analyzer section 1002 of a "composition unit" may contain but is not limited to analyzer type identification data 1003, which may either identify an atomic analyzer component, or another "composition unit" if the currently defined "composition unit" refines or encapsulates an already defined composed analysis component, an analysis trigger/event definition section 1004, which defines conditions/received input data that triggers the execution of the analysis step defined by the "composition unit", an analysis internal configuration section 1005, which contains configuration data for the defined analysis step, and a sub-analysis hooks section 1006, which may contain zero or more analysis hook records 1010, which specify relations to analysis components performing subsequent analysis tasks.

An analysis hook record 1010, which may be used to define the interaction between two analysis components, may contain but is not limited to a hook identifier 1011, identifying a specific analysis hook record, a hook trigger definition 1012 section, which defines the conditions that need to occur to trigger the execution of the analysis hook, a delegate analyzer identifier 1013, identifying the analysis step that should be triggered by the analysis hook, e.g., in form of a composition unit identifier 1001, or the identifier/name of an atomic analyzer component, a delegate analyzer configuration parameters section 1014, containing configurations for the analysis task that should be performed by the delegate analyzer when it is triggered via the analysis hook, a delegate communication configuration section 1015, defining the data that should be sent to the delegate analyzer as input of the analysis task requested by the analysis hook and data that should be provided by the delegate analyzer to describe the results of the requested analysis task, and a delegate result processing configuration 1016, which may be used to define how the triggering analysis step reacts on received sub-analysis results. As an example, delegate result processing configuration may be used to define whether an exhausted topology walk should trigger a subsequent topology walk following another topology dimension, e.g., by activating another sub-analysis hook. Delegate communication configuration data may also be referred to as analyzer interaction configuration data, or as interaction configuration data.

Referring now back to FIGS. 3, 4 and 5, which specify exemplary atomic analyzers, their configuration data 301, 401 and 501 and the communication data they send and receive, like observation events 310, analysis request events 410 and analysis result events 420, and relating them to the configuration means introduced with the "Composition unit" 1000 shown in FIG. 10.

Analyzer type identification data and analyzer internal configuration data may be used to first identify a specific atomic analyzer and then configure it according to the specified internal configuration data. The selection of atomic analyzers and their configuration remains stable during analysis runs. As an example, a "Composition unit" may refer to an atomic analyzer of type "Topology location analyzer" 500 and specify configuration data to select the type of monitoring data for analysis and the analyses that should be performed on selected monitoring data. The configuration to select monitoring data and the configuration for the analysis to be performed on the selected monitoring data remains unchanged during the analysis process.

However, analysis defined by this example "Composition unit" is triggered by a received analysis request 410, which contains topology location data 411. On receipt of such a topology location event, topology location data 411 may be forwarded (by an analysis execution context that interprets and executes the "Composition unit") to the referred atomic analyzer, after it was configured according to the configuration data stored in the "Composition unit". The receiving atomic analyzer may use the received topology location data to determine from which topology entity/region it should fetch data for analysis, which may change during the analysis process, and then perform analysis on the fetched monitoring data, where the types of performed analyses remain the same during the analysis process.

As a more concrete example, a "Composition unit" may be configured to select time series for CPU usage and then perform a simple test which checks whether the CPU usage is above a certain threshold. This "Composition unit" may first be triggered by an analysis request event 410 specifying "host A" as topology location 411. CPU usage data from "host A" may be fetched by the referred atomic analyzer in response, and the fetched CPU usage data may be analyzed to determine if it is above the specified threshold. Afterwards, the same "Composition unit" may be triggered with an analysis request event 410 specifying "host B" as topology location. In this case, the referred atomic analyzer may fetch CPU usage for "host B" and then perform the same threshold analysis on CPU usage data for "host B" as it performed previously for CPU usage data for "host A".

More generically, configuration data that is stored in "Composition units" and used to configure atomic analyzers defines the behavior of those atomic analyzers and remains stable during the analysis process. Communication, or interaction data, e.g., in form of observation events 310, analysis request events 410 or analysis result events 420, that is sent and received by atomic analyzers (where the routing of such communication data is defined by "Composition units" and executed by a analysis processing environment), in form of observation events 310 analysis request events 410, or analysis result events 420, specifies the topology location from which atomic analyzers fetch data to perform their analyses.

Coming now to FIG. 11, which shows an exemplary complex, multi-tiered analyzer that is defined using composed analysis components, which may be specified in a script that is notated in an analysis composition language as described in FIG. 10. The script refers to and delegates analysis tasks to atomic analysis components, like those shown in FIGS. 3 to 5.

A script-defined service dependency walker analyzer component 1100, which interacts with an atomic topology walker analyzer component 1102 and an atomic time series anomaly analyzer component 1104 to perform topology walk analyses along service call dependencies forms the first layer of the analysis process.

A second analysis layer is formed by another script-defined analysis component 1106 designed to perform vertical stack walks along vertical topology dependencies. This composed script-defined analyzer interacts with a generic topology walker analyzer component 1108 and a generic time series anomaly analyzer 1110 to perform topology walks along vertical technology stack dependencies represented in a topology model.

The script-defined service dependency walker analyzer 1100 may be define in form of a composition unit 1000, which contains a sub analysis hook 1010 to configure and trigger 1101 generic topology walker analyzer 1102 to follow a service call dependency between two services. Hook trigger definition 1012 of this sub analysis hook may specify that a detected anomaly on a currently visited service (e.g., by atomic generic time series anomaly analyzer 1103) is required to trigger the sub analysis, delegate analyzer identifier 1013 may identify generic topology walker analyzer 1102, and delegate analyzer config parameters 1014 may specify that topology relationships describing service call dependency from a provided service to other services should be followed. The delegate analyzer config parameters 1014 may also specify a direction for to be followed service call dependencies (e.g., in call direction, against call direction, or both). The delegate communication configuration 1015 may specify that topology identification data for a currently visited service may be sent to the receiving analysis component and that topology identification data of services that are reachable according to the analysis configuration should be returned from the analysis component.

A second sub analysis hook 1010 of the service dependency walker analyzer 1100 may specify the interaction with generic time series anomaly analyzer 1104. This sub analysis hook may specify that an analysis by time series anomaly analyzer 1104 is triggered when a new reachable service entity was reported (e.g., by an analysis step performed by generic topology walker analyzer 1102), and the analysis configuration parameters 1014 of this sub analysis hook may specify the time series that should be analyzed, the time period that should be considered for the analysis, the types of analyses that should be performed, and parameters for the to be performed analyses. The communication configuration may specify that topology identification data for the service that should be analyzed is provided to the triggered analyzer and that the analysis step should return whether an anomaly was detected for the service or not.

This two sub analysis hooks, together with their addressed atomic analysis components (1102 and 1104), implement a topology walk along service call dependencies.

A third sub analysis hook of the script-defined service dependency walker analyzer 1100 may be used to link 1105 the first, service-call related layer of the analysis with the second, technology stack related layer, which performs a vertical topology walk along the technology stack dependencies of services that were identified by the first layer of the analysis.

This third sub analysis hook may identify the script-defined vertical stack walker analyzer 1106 as delegate analyzer, and the hook trigger definition 1012 of this sub analysis hook may specify that the hook is activated when an anomaly was identified on a specific service, but no other services on which this specific service depends shows the same anomaly. This indicates that the anomaly of this specific service is not caused by other services on which it depends but may instead be caused by undesired/unexpected behavior of components that directly or indirectly provide or implement this specific service.

Delegate communication configuration 1014 of this third sub analysis hook may specify that topology identification data for the service which should be analyzed should be transferred to the receiving analyzer and that the receiving analyzer should return topology identification data for topology entities belonging to the technology stack of the service on which anomalies where detected, and that also the types of detected anomalies should be returned.

The script definition of the vertical stack walker analyzer 1106 may contain a sub analysis hook to configure and trigger 1107 a generic topology walker analyzer 1108 to perform a topology walk along vertical stack dependencies represented in a topology model. Vertical stack dependencies represent dependencies that components of a monitored environment have on other components that provide functionality, resources, or execution environments for them. Examples for vertical stack dependencies include but are not limited to the dependency of a service to the process providing or implementing the service, the dependency of a process to a container or host operating system providing resources and execution environment for the process, or the dependency of a virtualized host computing system to the virtualization environment provisioning this virtualized host computing system.

The delegate analyzer configured parameters 1014 of this analysis hook may specify that vertical stack dependencies may be followed from a depending topology entity (e.g., a service) to the topology entity on which it is depending (e.g., the process providing the service). Delegate communication configuration 1015 may specify that topology identity data for the depending entity may be provided and topology identity data for an identified entity on which the depending entity depends is returned.

A second sub analysis hook 1010 of the script-defined analyzer 1106 may trigger and configure a generic time series anomaly analyzer 1110 to perform topology type specific anomaly analyses for topology entities located on the vertical technology stack of a service.

The delegate analyzer configuration 1014 of this second analysis hook may contain specific time series selections, analysis types, analysis configurations, and time period definitions specifying the temporal extend of monitoring data considered for performed analyses, for each possible topology type. This way, different analyses may be performed for a process, container, host computing system or virtualization environment that is part of the horizontal stack of the to be analyzed service. Delegate communication configuration 1015 may specify that topology identification and topology type of a to be analyzed topology entity are transferred to the sub-analyzer, and that the sub-analyzer returns detected anomalies.

The analysis process defined in FIG. 11 contains a first analysis layer which is directed to follow service call dependencies to find explanations/causes of observed abnormal/undesired behavior on a service level. As an example, for a service showing unexpectedly high response times, explanations/causes may be searched in services that this service calls.

A second analysis layer follows vertical technology stack dependencies of a service to identify explanations/causes for an abnormal behavior of a service within the software and hardware components that implement this service.

The connection of those two analysis layers is realized by first following service call dependencies to finding explanations for abnormal behavior of a services on other services that are called by the service showing the abnormal behavior, according to the first analysis layer. If no other anomalies are found on other called services, that explain the abnormal behavior of the calling service, the analysis process switches to the second layer and starts an analysis of the software and hardware components implementing the last service in the service call chain that showed the abnormal behavior.

Coming now to FIGS. 12 and 13, which show exemplary "navigation macros" for common, not trivial error situations that can be observed in application provision environments. The purpose of those macros is to provide predefined, configurable analysis functionality that is tailored to identify typical error situations. Those macros could be used as part of custom analysis processes.

FIG. 12 describes a navigation macro directed to the identification of "unhealthy cluster" situations, where the cluster nodes of a cluster run heterogeneous software versions, and at least one of the deployed software versions shows undesired behavior. Goal of the "unhealthy cluster" detection macro is, to identify configured clusters, monitor the behavior of individual cluster nodes to detect deviating behavior of some of those cluster nodes and to identify and report software version/configuration differences between cluster nodes behaving as expected and cluster nodes behaving abnormal.

This situation is exemplary depicted 1200 on the left side of FIG. 12, where a load balancing entity 1210 delegates received traffic to nodes 1201, 1203, 1205 and 1207 of a cluster 1200. Received traffic is distributed evenly and forwarded 1211, 1212, 1213 and 1214 to cluster nodes 1201, 1203, 1205 and 1207.

Cluster nodes 1201 and 1203 run software version v1 1202 and cluster nodes 1205 and 1207 run software version v2 1206. Cluster nodes 1201 and 1203 operate as expected, whereas cluster nodes 1205 and 1207 show unexpected behavior.

The flow chart on the right side of FIG. 12 describes the process 1220 that is performed by an "unhealthy cluster" detection macro to identify situations where heterogeneous software versions deployed on the nodes of a cluster cause undesired behavior of the cluster.

The process starts with step 1221, e.g., when an analysis process that contains an "unhealthy cluster" detection macro identifies a trigger situation for the macro, like a less than expected throughput of a specific application component. The enclosing analysis may be performed on an abstraction level in which a whole cluster (i.e., a load balancer 1210 and cluster nodes 1201, 1203, 1205 and 1207) are represented as a single (service) topology entity. In following step 1222 a configurable cluster detection mechanism is applied on the to be analyzed topology entity, to determine whether the entity is implemented in form of a cluster. As an example, a topology model may distinguish between services and service entities, where a service represents the service functionality in an abstract way, hiding the technical details of the provision of the services, like load balancers or cluster nodes.

Service entities may then be used to link the service functionality to those entities, like individual processes, which implement the service functionality. Those individual processes may run on different nodes of a cluster. Services and service instances may be represented as different entities in a topology model, and a service entity may be connected with a service instance entity implementing the service functionality with a vertical topology relationship of a specific type, like "implemented by".

The cluster detection mechanism may first use vertical topology relationship data to determine whether the service is provided by multiple service instances, and then use service call dependency relationship data to determine whether traffic received by those service instances is received from one specific load balancer. If the cluster detection mechanism identifies such a configuration, it may indicate that the service is provided by a cluster.

Following decision step 1223 may terminate the process with step 1229 if no cluster configuration was detected in step 1222. In this case, also an indication may be generated signaling that no unhealthy cluster situation was detected.

Otherwise, step 1224 may be executed, which may use monitoring data for each of the identified cluster/worker nodes to determine whether the performance or functionality related behavior of the cluster nodes differ in a way that some cluster nodes show an unexpected/undesired behavior, whereas other cluster nodes do not show the unexpected/undesired behavior. An unexpected/undesired behavior may e.g., be given if those cluster nodes show an error rate that is higher than expected, or if the response time of those cluster nodes is longer than expected. In case no deviation of cluster nodes in terms of undesired behavior was identified, following decision step 1225 may terminate the process with step 1229. Also in this case, an indication may be generated signaling that no unhealthy cluster situation was detected.

Otherwise, the process continues with step 1226, which identifies those cluster nodes that show the unexpected behavior. Optionally, step 1226 may also report the identified cluster nodes.

Following step 1227 may perform a configurable analysis to identify differences in installed software versions and/or software configuration data between the cluster nodes showing abnormal behavior and the cluster nodes that behave as expected. Step 1227 may e.g., compare versions of installed software on those cluster nodes, or differences of configuration data for the software installed on the cluster nodes. In addition, step 1227 may analyze the traffic routing configuration of the cluster to determine differences between the traffic that is routed to cluster nodes showing abnormal behavior vs. cluster nodes working as expected.

Afterwards, step 1228 may report identified differences between normally and abnormally behaving cluster nodes, together with an indication that an unhealthy cluster situation was detected. The process then ends with step 1229.

FIG. 13 presents an exemplary navigation macro that may be used to detect "CrashLoopBackOff" situations. "CrashLoopBackOff" occur in automated execution management systems like Kubernetes, where load that is received by an application is monitored and application instances are automatically started and terminated to adapt the active application infrastructure to the current traffic situations. In such environments, application nodes are automatically started and terminated without human intervention. In case startup of a new application node or worker instance fails, e.g., due to a configuration error, the execution automation system spawns a new application node, which crashes again. In the worst case, this behavior can lead to situations where new application instances are started and then crash in an endless loop. This wastes valuable resources of the execution automation system without generating any value for the executed application. Therefore, it is desired to identify and correct such situations quickly.

The block diagram 1300 on the left side of FIG. 13 illustrates this situation. An execution management system 1301 detects that the start of a new worker instance is required and in response initiates the start 1310 of this worker instance 1302. During startup and initialization of the worker instance, an unexpected situation occurs, which leads to a crash 1311 of the worker instance during startup. The execution management system, 1301 detects 1312 that the to be started worker instance 1302 has crashed, and in response initiates the restart 1313 of a new worker instance 1303, which again crashed during startup 1314. This crash is again detected by the execution management system 1301, which again starts a new worker instance. This undesired behavior may be prolonged indefinitely 1316.

The flow chart 1320 on the right side of FIG. 13 describes the behavior of a "CrashLoopBackOff" navigation macro to identify such situations.

The process starts with step 1321, when an indication that a "CrashLoopBackOff" situation is received by a configured "CrashLoopBackOff" navigation macro. Such indications may include an overall number of application node restarts per time interval that is above a certain threshold, or the amount of traffic processed by an observed application does not scale with received traffic as expected.

Configuration data for the "CrashLoopBackOff" navigation macro may contain configuration data for the identification of monitoring data from equivalent application nodes that were executed sequentially, and configuration data for the identification of monitoring data indicating a restart loop situation.

Configuration data to identify monitoring data for application worker nodes may specify features of application nodes that those application nodes have in common and that are used as identifiers for monitoring data time series or events that describe the operation of those events. Name prefixes, postfixes or name patterns for processes or execution environments that are used by execution management environments 1301 as naming conventions or naming configurations to name and identify application worker instances (e.g., 1302 and 1303) may be contained in configuration data to identify application worker nodes.

As an example, an application deployment may contain a component for processing purchase requests having a name like "purchase". When application worker node instances based on this component are created by an execution management system, names for those instances may be created by appending a specific postfix, like "_worker_", and a serial number to the name of the component on which the worker instance is based. This would lead to instance names like "purchase_worker_1", "purchase_worker_2" and the like. In this case, worker identification configuration would select processes or execution environments with names that contain the worker identifier postfix "_worker_", followed by an arbitrary number.

The monitoring system may capture names or identifiers of available processes or execution environment and use them as identifiers for monitoring data describing the behavior of those entities. As an example, time series data describing resource consumption or even availability of those processes or execution environments may be captured and stored in form of time series, where identification data for those time series also contains the names of those entities. In addition, data describing events that occurred with or on those entities, like termination of their execution may be captured by the monitoring system. This event-based monitoring data may also be enriched with the names of the entities on which it was observed.

Loop detection configuration of a "CrashLoopBackOff" macro may specify a minimum number observed restarts of application nodes per time interval, or a maximum observed worker instance up time (time between start of a worker instance/application node to its termination), to filter "CrashLoopBackOff" situations. As an example, only situations in which more than 10 instances of a specific application node were started and terminated within a time frame of one minute, and where maximum up time of one of those instances is less than 5 seconds may be considered as "CrashLoopBackOff" situations. In addition, the loop detection configuration may specify that all those instances are terminates unintentionally, e.g., with a crash of the application node. An application node or worker instance 1302 may either be a stand-alone process or an execution environment in which a process is executed, where at least initialization and start of the process or execution environment is managed by an execution management system 1301.

Following step 1322 then uses configuration data to identify monitoring data for equivalent application nodes to fetch monitoring data describing availability of application nodes, and reasons for the execution termination of those worker nodes from the monitoring data storage 111. Continuing with above "purchase" worker example, after an anomaly in the processing of purchase requests was identified, step 1322 may select monitoring data describing availability and execution termination of processes or execution environment that follow the naming convention "purchase_ worker_", followed by an arbitrary number, where the start time of those processes or execution environments falls into the time period in which the anomaly of purchase request processing was observed.

Afterwards, step 1323 may analyze the monitoring data provided by step 1322 to determine whether a "CashLoopBackOff" situation occurred. Step 1323 may apply the loop detection configuration of the "CrashLoopBackOff" analysis macro for this analysis. This analysis may first identify events indicating the unintended termination of worker executions and then use the names of the so identified worker executions to select monitoring data describing the execution duration of those worker executions. The execution duration data may then be analyzed to identify and filter those worker executions with an execution time that is below the maximum up time specified in the loop detection configuration. The result of above monitoring data gathering, and analysis steps are the names or identifiers of those worker executions that were executed while the anomaly that triggered the analysis was observed, that were unintentionally terminated (i.e., due to a crash), and which had an execution time that indicates a crash during startup due to its short duration. The set of so identified short-living worker executions that were also terminated by a crash may then be analyzed to determine whether they indicate the existence of a "CrashLoopBackOff" situation. As an example, the number of short-living and crashed workers may be divided by the time period during which the abnormal condition that triggered the analysis was observed, to calculate a worker restart rate. If this worker restart rate is above a certain threshold, a "CrashLoopBackOff" situation may be assumed.

Following step 1324 may report the previously determined "CrashLoopBackOff" status and the process then ends with step 1325.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways.

What is claimed is:

1. A computer-implemented system for analyzing monitoring data in a distributed computing environment, comprising:

a monitoring data repository stores monitoring data, where the monitoring data describes execution of computing resources in the distributed computing environment;

a topology model includes topology entities which collectively describe a network topology of the computing resources comprising the distributed computing environment and defines relationships between the computing resources;

a topology dependency analyzer configured to receive an observation event, wherein the topology dependency analyzer identifies functional dependencies with the given topology entity by traversing the topology model according to configuration data and generates a local analysis request event, where the observation event contains data for an unexpected situation described by monitoring data and data identifying a given topology entity on which the observed event was observed, and the configuration data specifies how to traverse the topology model, and the local analysis request event identifies a specific topology entity on which to perform further analysis; and a local analyzer configured to receive the local analysis request event from the topology dependency analyzer and retrieve monitoring data from the monitoring data repository for the specific topology entity, wherein the local analyzer analyzes the monitoring data associated with the specific topology entity and, in response to the analysis, generates a local analysis result event.

2. The computer-implemented system of claim 1 further comprises an agent instrumented into a computing resource in the distributed computing environment, where the agent is configured to capture monitoring data pertaining to the execution of the computing resource and monitoring data pertaining to the topology model.

3. The computer-implemented system of claim 1 further comprises a trigger event generator configured to receive trigger data which specifies a topology entity in the distributed computing environment and retrieve monitoring data for the specified topology entity from the monitoring data repository, wherein the trigger event generator analyzes the monitoring data according to the trigger data and generates the observation event.

4. The computer-implemented system of claim 3 wherein the trigger data further specifies type of analysis to be performed by the trigger event generator and criteria for generating an observation event by the trigger event generator, and the trigger event generator generates an observation event in response to the monitoring data meeting the specified criteria.

5. The computer implemented system of claim 1 further comprises a user interface configured to receive from a system user select monitoring data indicating the unexpected situation and generate the observation event using the select monitoring data.

6. The computer-implemented system of claim 1 wherein the topology dependency analyzer is configured to receive the configuration data from a system user and the configuration data specifies type of topology connections to traverse, a traversal direction and a maximum number of traversal steps.

7. The computer-implemented system of claim 1 wherein the local analyzer analyzes the monitoring data according to configuration data, where the configuration data specifies a subset of monitoring data to be selected for analysis, a type of analysis to be performed on the selected monitoring data, and parameters for performing the analysis.

8. The computer-implemented system of claim 1 wherein the topology dependency analyzer is configured to receive the local analysis result event from the local analyzer and continue traversing the topology model in accordance with the local result event, where the local analysis result event describes outcome of the analysis performed by the local analyzer.

9. The computer-implemented system of claim 6 wherein the topology dependency analyzer continues to traverse the topology model until the maximum number of traversal steps is reached.

10. The computer-implemented system of claim 1 further comprises a second topology dependency analyzer configured to receive a secondary observation event and identifies functional dependencies with the given topology entity by traversing the topology model in a direction different from traversal performed by the topology dependency analyzer, where the secondary observation event contains data for the unexpected situation described by monitoring data and data identifying the given topology entity on which the observed event was observed.

11. The computer-implemented system of claim 10 wherein the topology dependency analyzer generates the secondary observation event in response to outcome of the local analysis result event and absence of topology entities to be traversed in the topology model according to the configuration data.

12. The computer-implemented system of claim 10 wherein the second topology dependency analyzer generates another local analysis request event for another local analyzer, where the another local analysis request event identifies a different topology entity on which to perform further analysis.

13. The computer-implements system of claim 1 further comprises a visualization tool interfaced with the topology dependency analyzer and configured to generate a graph of topology entities traversed by the topology dependency analyzer.

* * * * *